（12）United States Patent
Morishita et al.

(10) Patent No.: US 8,041,909 B2
(45) Date of Patent: *Oct. 18, 2011

(54) DISK ARRAY SYSTEM AND METHOD FOR MIGRATING FROM ONE STORAGE SYSTEM TO ANOTHER

(75) Inventors: Noboru Morishita, Yokohama (JP); Yusutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 621 days.

This patent is subject to a terminal disclaimer.

(21) Appl. No.: 11/890,971

(22) Filed: Aug. 7, 2007

(65) Prior Publication Data

US 2008/0098183 A1    Apr. 24, 2008

Related U.S. Application Data

(63) Continuation of application No. 11/513,553, filed on Aug. 30, 2006, now Pat. No. 7,269,667, which is a continuation of application No. 10/939,914, filed on Sep. 8, 2004, now Pat. No. 7,114,012.

(30) Foreign Application Priority Data

Jul. 15, 2004  (JP) ................................. 2004-208752

(51) Int. Cl.
*G06F 12/02* (2006.01)
*G06F 13/14* (2006.01)

(52) U.S. Cl. . 711/162; 711/152; 711/165; 711/E12.001; 710/104

(58) Field of Classification Search .......................... None
See application file for complete search history.

(56) References Cited

U.S. PATENT DOCUMENTS

| | | | | |
|---|---|---|---|---|
| 4,244,019 A | * | 1/1981 | Anderson et al. | 709/208 |
| 5,235,689 A | * | 8/1993 | Baker et al. | 710/305 |
| 5,757,642 A | * | 5/1998 | Jones | 700/5 |
| 5,835,954 A | | 11/1998 | Duyanovich et al. | |
| 5,898,843 A | * | 4/1999 | Crump et al. | 710/100 |
| 5,960,169 A | * | 9/1999 | Styczinski | 714/6 |
| 6,108,748 A | | 8/2000 | Ofek et al. | |

(Continued)

FOREIGN PATENT DOCUMENTS

EP    0848321 A2    6/1998

(Continued)

OTHER PUBLICATIONS

"Data Base Control and Processing System." IBM Technical Disclosure Bulletin, Dec. 1982.*

*Primary Examiner* — Reginald Bragdon
*Assistant Examiner* — Daniel J Bernard
(74) *Attorney, Agent, or Firm* — Kilpatrick Townsend & Stockton LLP

(57) ABSTRACT

The present invention provides a storage system for migrating a storage apparatus. The storage system comprises the steps of: defining a logical volume on a storage apparatus to be migrated coupled to a first controller as a local volume coupled to a second controller; setting to receive an access targeted to the logical volume through an input/output port of the storage apparatus to be migrated, as the local volume coupled to the second controller; blocking the input/output port of the storage apparatus to be migrated; connecting the other input/output port of the storage apparatus to the second control apparatus.

4 Claims, 22 Drawing Sheets

U.S. PATENT DOCUMENTS

| | | | |
|---|---|---|---|
| 6,115,772 A * | 9/2000 | Crater | 710/306 |
| 6,598,134 B2 | 7/2003 | Ofek et al. | |
| 6,636,908 B1 | 10/2003 | Winokur et al. | |
| 6,728,824 B1 * | 4/2004 | Chen | 711/1 |
| 6,880,059 B2 | 4/2005 | Mizuno et al. | |
| 6,922,761 B2 | 7/2005 | O'Connell et al. | |
| 7,114,012 B2 * | 9/2006 | Morishita et al. | 710/1 |
| 7,269,667 B2 * | 9/2007 | Morishita et al. | 711/152 |
| 2002/0188768 A1 | 12/2002 | Hirakawa et al. | |
| 2004/0044865 A1 | 3/2004 | Sicola et al. | |
| 2004/0210713 A1 * | 10/2004 | Kanai | 711/113 |
| 2004/0260873 A1 | 12/2004 | Watanabe | |
| 2005/0015646 A1 | 1/2005 | Okada et al. | |
| 2005/0097122 A1 * | 5/2005 | Schafflutzel et al. | 707/102 |
| 2005/0193180 A1 | 9/2005 | Fujibayashi | |
| 2005/0216591 A1 | 9/2005 | Sato | |
| 2008/0104338 A1 * | 5/2008 | Kinoshita et al. | 711/152 |

FOREIGN PATENT DOCUMENTS

| | | |
|---|---|---|
| EP | 1396789 A2 | 3/2004 |

* cited by examiner

FIG. 4A

LOGICAL VOLUME MANAGEMENT INFORMATION ~61

| LOGICAL VOLUME NUMBER |
| --- |
| LOGICAL VOLUME CAPACITY |
| LOGICAL VOLUME STATE |
| HOST DEFINITION INFORMATION LIST |
| DRIVE GROUP NUMBER |
| EXTERNAL VOLUME NUMBER |

FIG. 4B

DRIVE GROUP MANAGEMENT INFORMATION ~62

| DRIVE GROUP NUMBER |
| --- |
| DRIVE GROUP CAPACITY |
| DRIVE GROUP STATE |
| LOGICAL VOLUME NUMBER |
| DRIVE GROUP ATTRIBUTE INFORMATION |
| DRIVE INFORMATION LIST |

FIG. 4C

EXTERNAL VOLUME MANAGEMENT INFORMATION ~63

| EXTERNAL VOLUME NUMBER |
| --- |
| EXTERNAL VOLUME CAPACITY |
| EXTERNAL VOLUME STATE |
| LOGICAL VOLUME NUMBER |
| EXTERNAL VOLUME ATTRIBUTE INFORMATION |
| EXTERNAL VOLUME ACCESS PATH LIST |

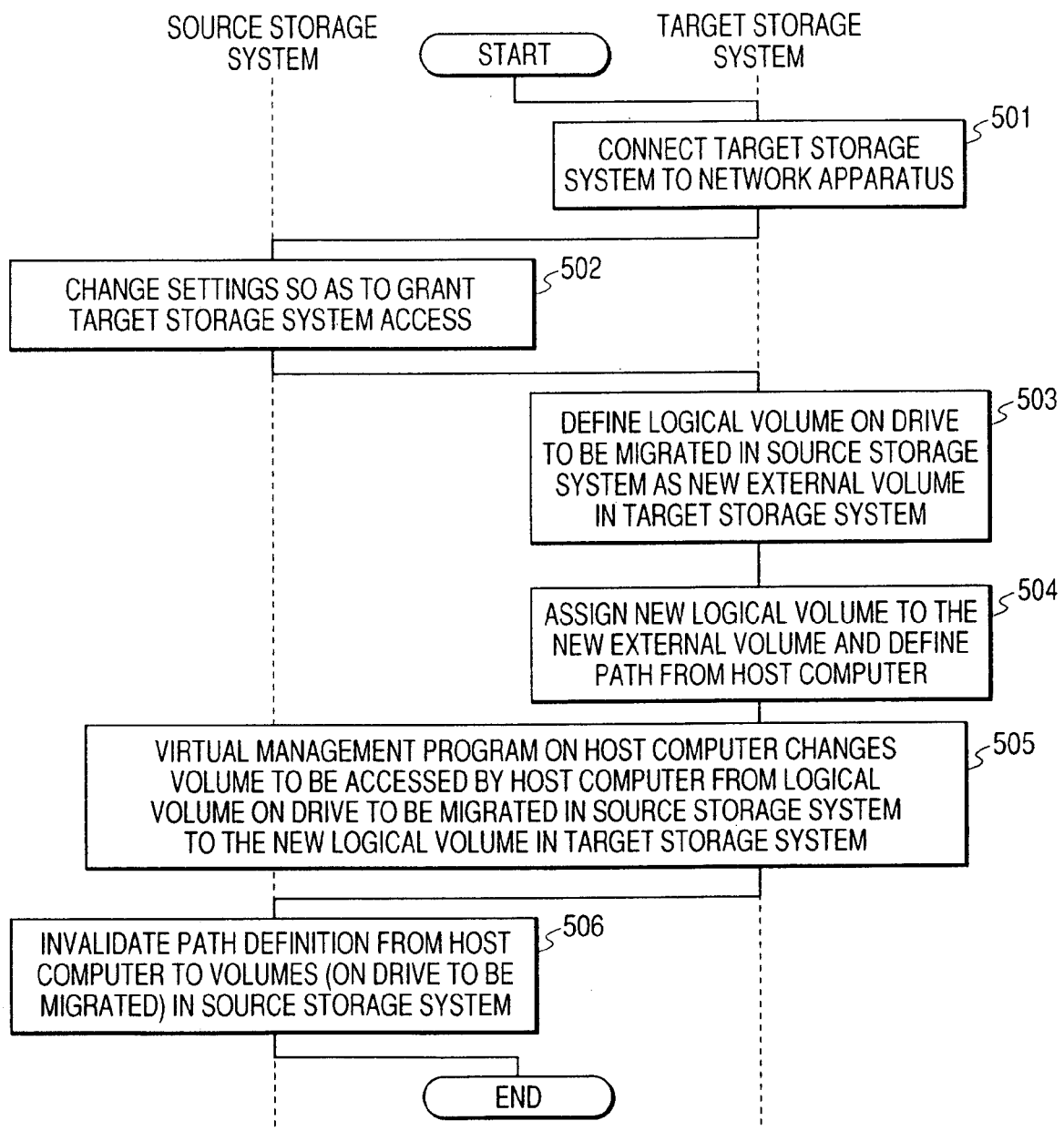

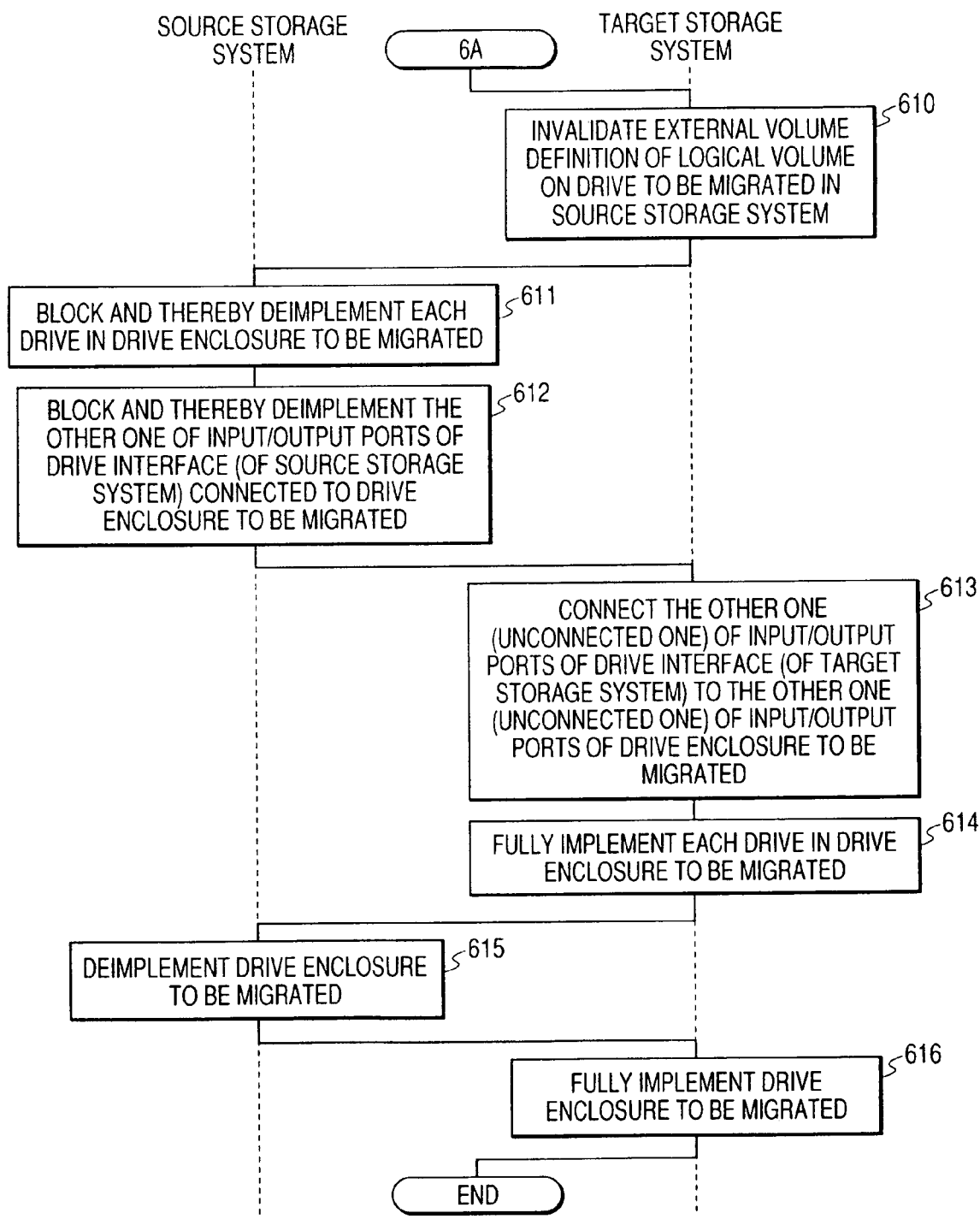

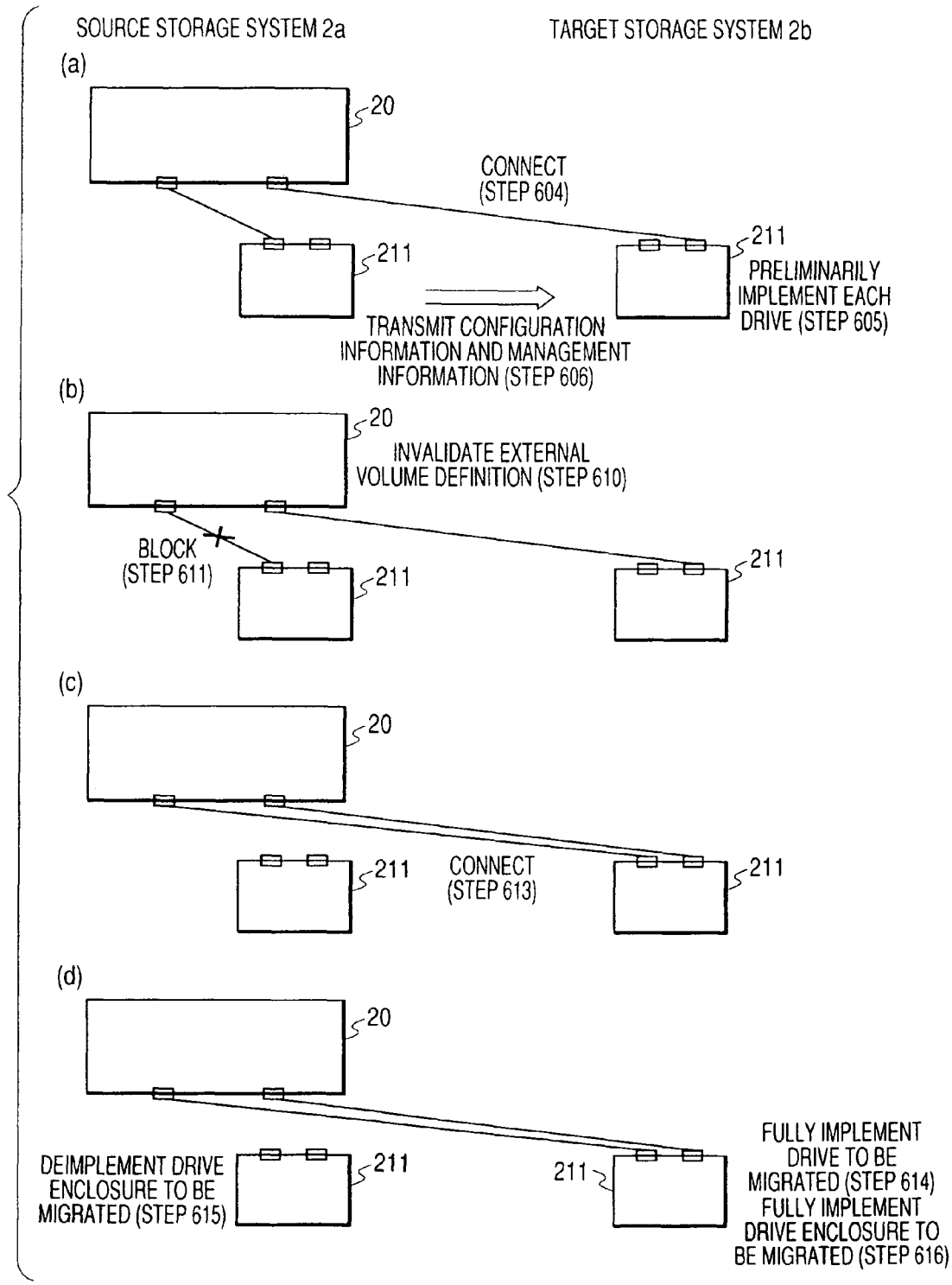

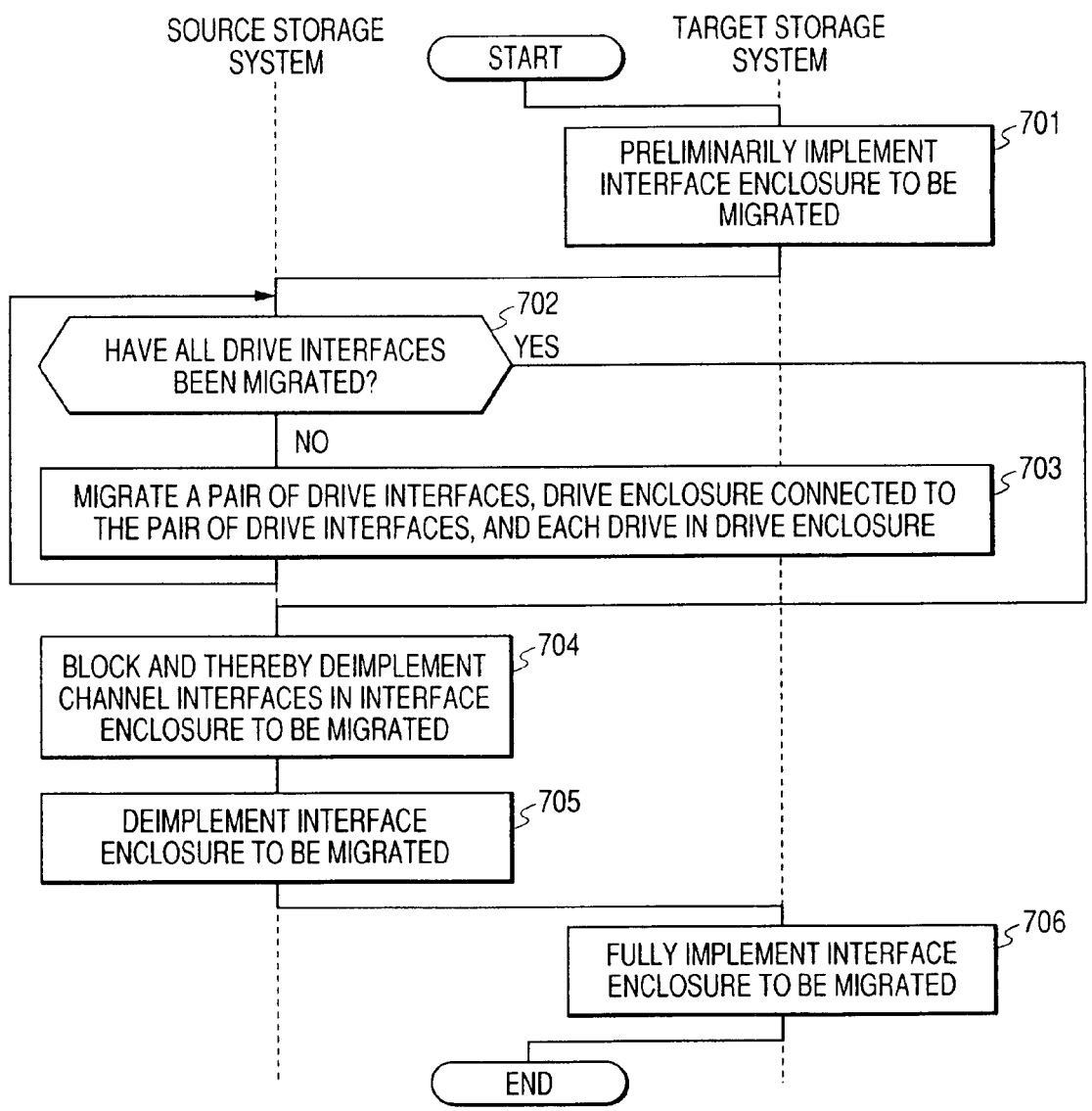

FIG. 10A
SOURCE STORAGE SYSTEM 2a          TARGET STORAGE SYSTEM 2b
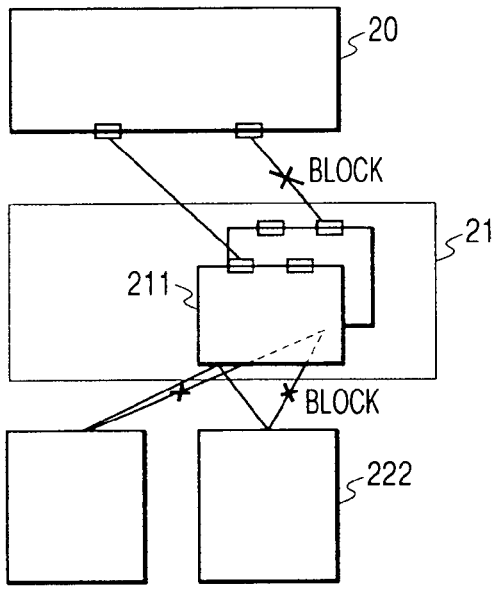
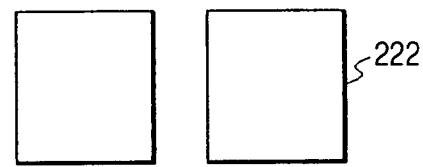
FIG. 10B
SOURCE STORAGE SYSTEM 2a          TARGET STORAGE SYSTEM 2b
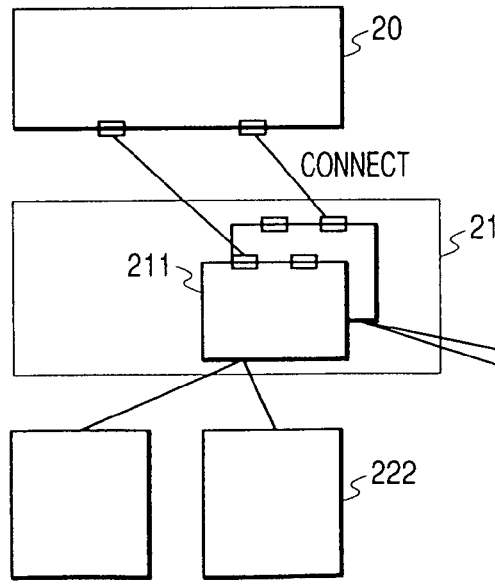
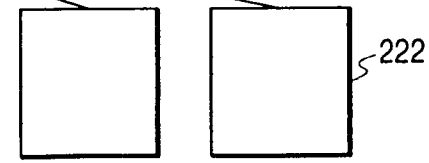

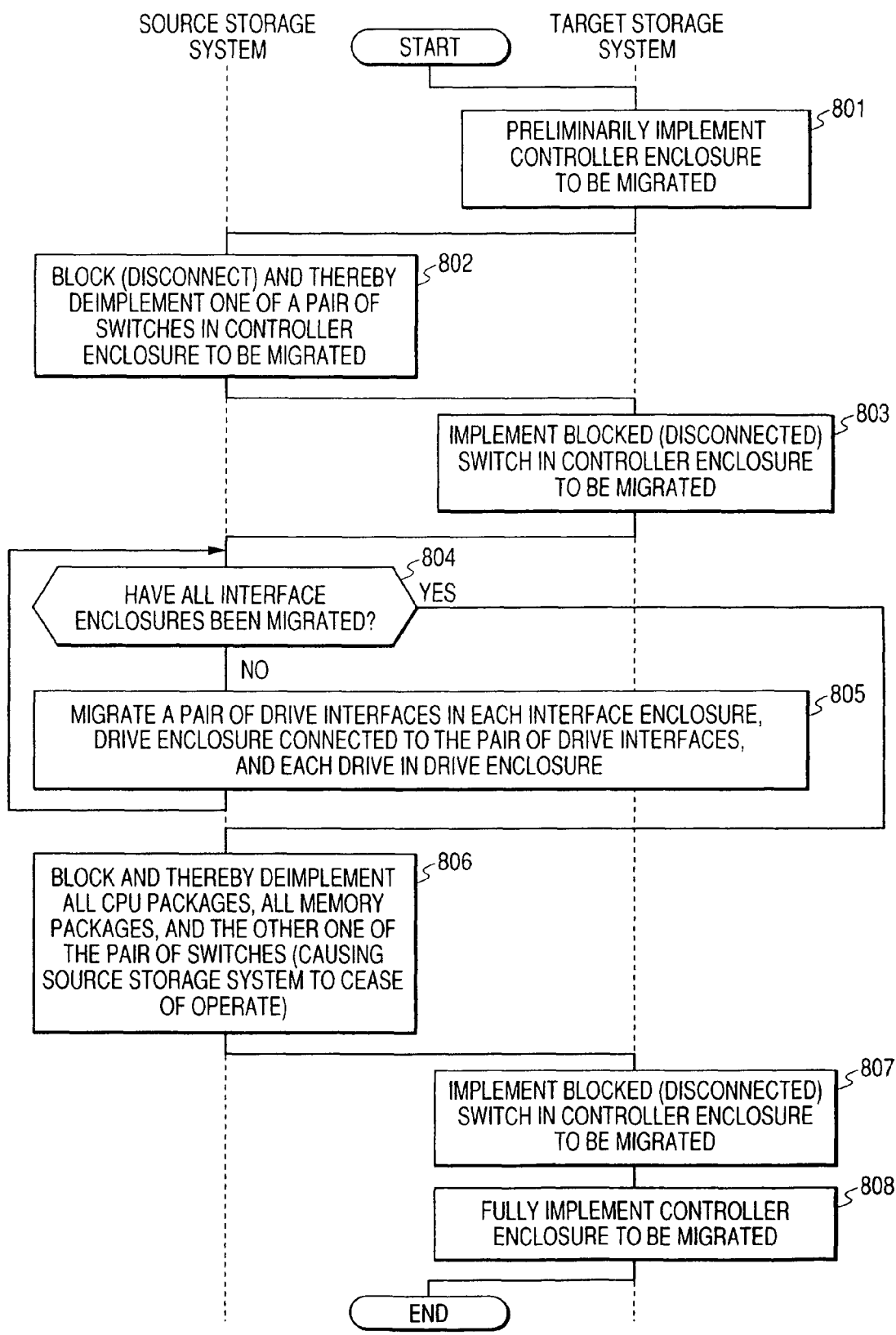

DISK ARRAY SYSTEM AND METHOD FOR MIGRATING FROM ONE STORAGE SYSTEM TO ANOTHER

CROSS-REFERENCE TO RELATED APPLICATION(S)

This application is a continuation of U.S. patent application Ser. No. 11/513,553, filed Aug. 30, 2006, which is a continuation of U.S. patent application Ser. No. 10/939,914, filed Sep. 8, 2004, which application claims priority from Japanese Patent Application No. 2004-208752, filed Jul. 15, 2004, the entire disclosure of which is incorporated herein by reference.

BACKGROUND OF THE INVENTION

The present invention relates to a method for migrating from one storage system to another, and more particularly to a method for smoothly migrating data from one storage system to another without shutting down these systems.

Data migration techniques for moving data stored in one storage system to another storage system are important in running a computer system to which storage systems are connected. For example, when a new storage system is introduced, the data in the old storage system may need to be moved to the new storage system.

Further, data may be moved from a storage system under high load conditions to that under low load conditions while using these storage systems. Data migration may be carried out not only between storage systems but also between storage devices in a storage system.

U.S. Pat. No. 6,108,748 discloses a technique of migrating data from one storage system to another transparently to the host while maintaining access by the host. This technique connects the new storage system to which data is to be migrated between the host computer and the old storage system from which the data is to be migrated. The data to be migrated is moved from the old storage system to the new storage system while the new storage system is receiving read/write requests for the data from the host computer. When the new storage system has received a read/write request for data to be migrated which has not yet been migrated, the new storage system first issues a read request to the old storage system to migrate that data and then processes the read/write request after the data migration.

BRIEF SUMMARY OF THE INVENTION

When a new storage system is introduced, it may be desirable to continue to use some or all of the old storage system so as to effectively utilize all existing assets.

Further, as the capacity of storage systems has increased, the time it takes to migrate data stored in them has tended to increase.

However, the above conventional technique does not consider how to utilize the old storage system after data migration. Therefore, the old storage system may need to be abandoned or used for a different purpose, for example.

Further, even though the above conventional technique allows the system to be run without interruption while migrating data, the system load increases during the data migration since the data to be migrated is actually transferred from the old storage system to the new storage system, resulting in reduced system performance.

The present invention has been devised to solve the above problem. It is, therefore, an object of the present invention to migrate data from a source storage system (or an old storage system) to a target storage system (or a new storage system) on a drive basis while receiving read/write requests for the data from the host computer and continuously using some of the source storage system without directly transferring the data from the source storage system to the target storage system.

The present invention provides a method for migrating from one storage system (a source storage system) to another storage system (a target storage system) in a computer system in which a host computer, the source storage system, and the target storage system are connected to one another through a network. The host computer has running thereon a management program for switching between volumes of the source and target storage systems to selectively access one of the volumes. The source and target storage systems each include: a storage apparatus made up of a disk drive(s); a storage control apparatus; a storage interface unit for connecting between the storage apparatus and the storage control apparatus; and a host interface unit for connecting between the host computer and the storage control apparatus. Each storage apparatus has a plurality of input/output ports which are connected with the input/output ports of a respective storage interface unit, forming an interface pair.

The method comprises the steps of: causing the management program on the host computer to switch from a logical volume of the source storage system to a logical volume of the target storage system to access the logical volume of the target storage system; defining a logical volume defined on the storage apparatus (hereinafter referred to as "the storage apparatus to be migrated") in the source storage system as an external volume of the target storage system, and causing the host computer to access the logical volume on the storage apparatus to be migrated through the network as the external volume of the target storage system; connecting an input/output port of the storage interface unit in the target storage system with an input/output port of the storage apparatus to be migrated; transmitting information on the disk drive and the logical volume of the storage apparatus to be migrated to the target storage system through the network; defining the logical volume on the storage apparatus to be migrated as a logical volume of the target storage system; causing the host computer to access the disk drive of the storage apparatus to be migrated through the connected input/output ports as the logical volume of the target storage system; and blocking an input/output port of the storage apparatus to be migrated, the input/output port being currently connected to an input/output port of the storage interface unit in the source storage system.

Thus, the present invention migrates a storage apparatus in the source storage system to the target storage system by causing the host computer to access the storage apparatus to be migrated as a storage apparatus of the target storage system.

The above disclosed arrangement allows the present invention to provide a method for migrating data from a source storage system to a target storage system on a drive basis while receiving read/write requests for the data from the host computer and continuously using some of the source storage system without directly transferring the data from the source storage system to the target storage system.

BRIEF DESCRIPTION OF THE DRAWINGS

FIG. 4A is a diagram showing logical volume management information;

FIG. 4B is a diagram showing drive group management information;

FIG. 4C is a diagram showing external volume management information;

FIG. 5 is a flowchart of a first process of a first method for migrating data from a source storage system 2a to a target storage system 2b, wherein a drive enclosure 20 containing a drive 201 to be migrated is migrated from the source storage system 2a to the target storage system 2b together with all the drives 201 in the drive enclosure 20;

FIG. 6B is a second flowchart of the second process of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20;

FIG. 7B is a second schematic diagram of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20:

FIG. 9 is a flowchart of a third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21;

FIG. 10A is a first schematic diagram of the third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21;

FIG. 10B is a second schematic diagram of the third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21;

FIG. 11 is a flowchart of a fourth method for migrating data from the source storage system 2a to the target storage system 2b, wherein the drive enclosure 20 containing the drive 201 to be migrated and the interface enclosure 21 and the switches 222 in a controller enclosure 22 which are connected to the drive enclosure 20 are migrated from the source storage system 2a to the target storage system 2b together with all the drives 201 in the drive enclosure 20 and all the drive interfaces in the interface enclosure 21;

DESCRIPTION OF THE PREFERRED EMBODIMENTS

Preferred embodiments of the present invention will be described below with reference to FIGS. 1 to 17.

First Embodiment

A first embodiment of the present invention will be described below with reference to FIGS. 1 to 15.

A description will be given of the configuration of a computer system including storage systems according to the first embodiment of the present invention with reference to FIG. 1.

Figure 1:
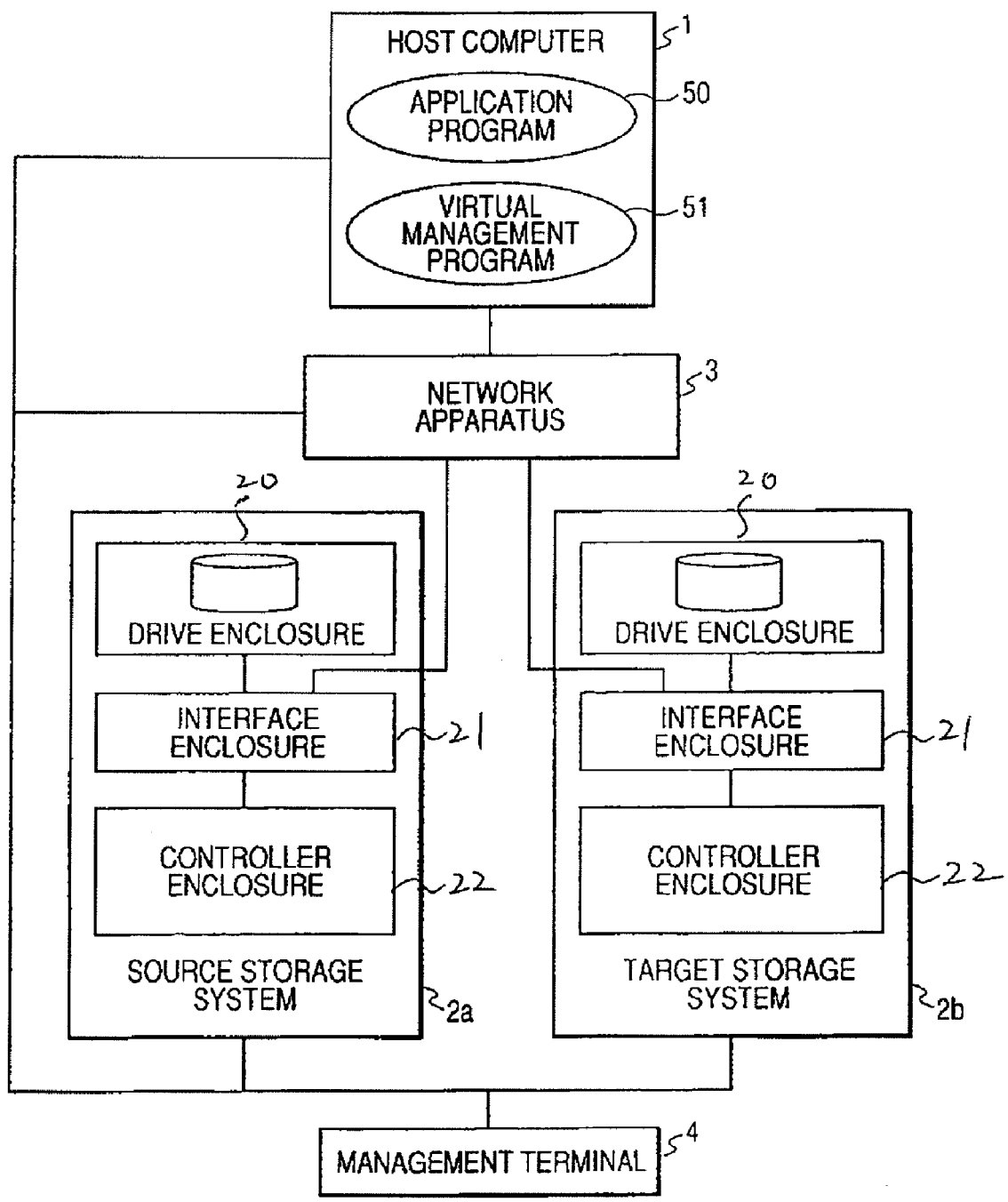
FIG. 1 is a diagram showing the configuration of a computer system including storage systems according to a first embodiment of the present invention.

FIG. 1 is a diagram showing the configuration of the computer system including storage systems according to the first embodiment.

The computer system of the first embodiment is configured such that storage systems 2 are connected to a host computer 1 through a network apparatus 3.

Specifically, a source storage system 2a from which data is to be migrated and a target storage system 2b to which the data is to be migrated are connected to the host computer 1 through the network apparatus 3 during data migration operation, as shown in FIG. 1.

Further, the source storage system 2a, the target storage system 2b, the host computer 1, and the network apparatus 3 are all connected to a management terminal 4.

An application program 50 and a virtual management program 51 are loaded into and executed by the host computer 1. The virtual management program 51 has a function to, when the application program 50 has issued a read/write request for a volume, switch it with another volume transparently to the application program 50 in order to support data migration from the source storage system 2a to the target storage system 2b.

A description will be given below of the internal configuration of the storage systems according to the first embodiment of the present invention with reference to FIG. 2.

Figure 2:
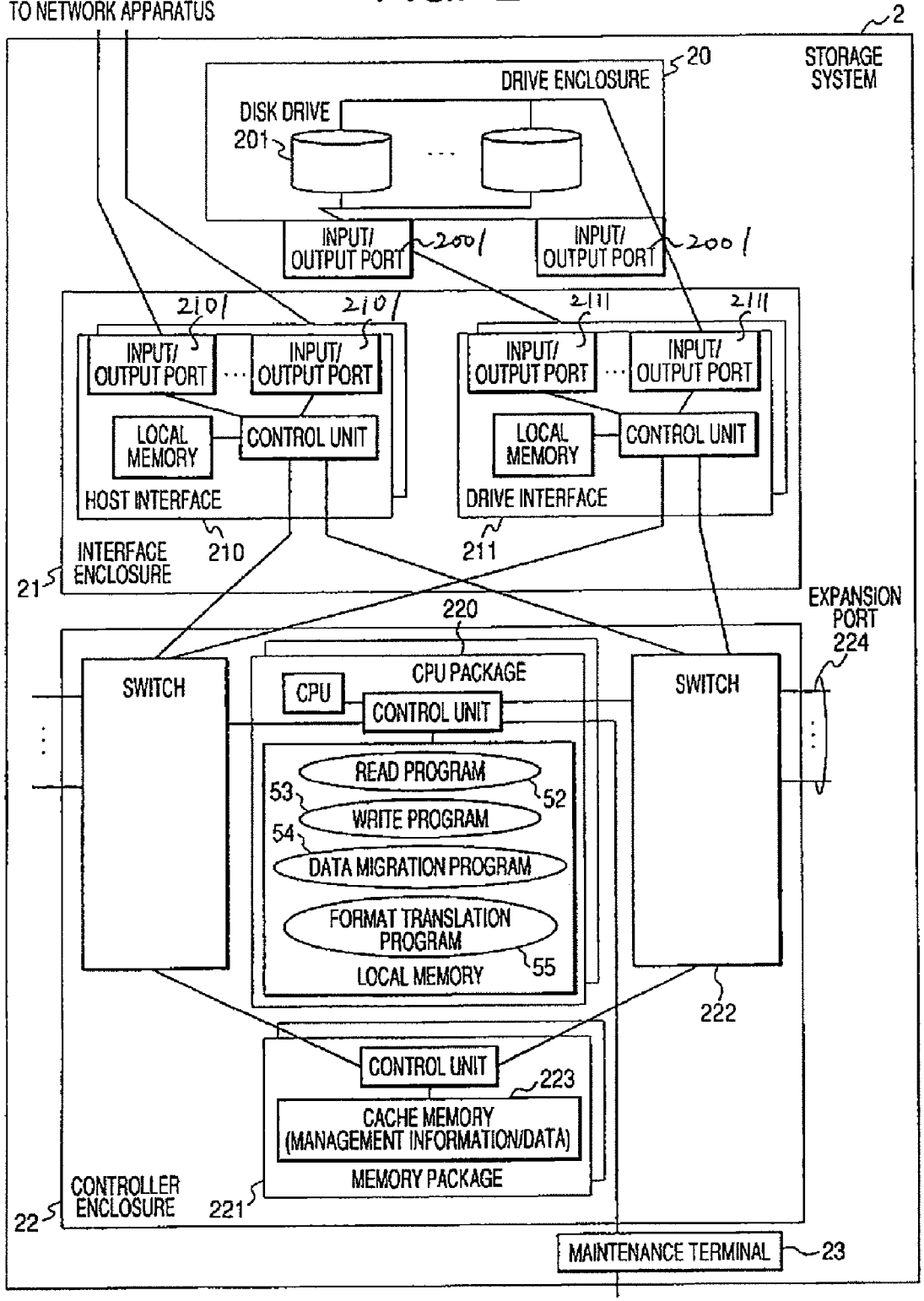
FIG. 2 is a diagram showing the internal configuration of the storage systems according to the first embodiment of the present invention.

FIG. 2 is a diagram showing the internal configuration of the storage systems according to the first embodiment of the present invention.

Each storage system 2 (the source storage system 2a and the target storage system 2b) comprises a drive enclosure 20, an interface enclosure 21, a controller enclosure 22, and a maintenance terminal 23.

The drive enclosure 20 contains one or a plurality of disk drives 201, which are storage apparatuses. It should be noted that the first and second embodiments of the present invention will be described as applied to storage apparatuses made up of magnetic disk drives. However, the first and second embodiments may be applied to storage apparatuses made up of other types of recording disks such as optical disks, or other recording media such as flash memory and semiconductor disks.

Each drive 201 has a plurality of input/output ports 2001. Further, each storage system 2 may include a plurality of drive enclosures 20.

The controller enclosure 22 contains a CPU package 220, a memory package 221, and a plurality of switches 222 collectively constituting a storage control unit. It should be noted that the controller enclosure 22 may contain a plurality of CPU packages 220 and a plurality of memory packages 221.

The CPU package 220 has therein a CPU, local memory, and a data transfer control unit.

A read program 52, a write program 53, a data migration program 54, a format translation program 55, etc. are loaded into the local memory and executed.

Further, the memory package 221 has therein cache memory 223 and a data transfer control unit.

The cache memory 223 relays data between the host computer 1 and each drive 201 so as to enhance performance.

The switches 222 are connected to host interfaces 210, drive interfaces 211, and the CPU and the memory packages 220 and 221, and relay data to them. Further, each switch 222 has an expansion port 224 for connecting with a switch 222 in another controller enclosure 22 for data exchange, enabling a plurality of controller enclosures 22 to operate as a single storage control apparatus.

The interface enclosure 21 contains: the host interfaces 210 for controlling the data transfer between the host computer 1 and the cache memory 223; and the drive interfaces 211 for controlling the data transfer between the cache memory 223 and each drive 201.

The host interfaces 210 receive read/write requests, etc. from the host computer 1, as well as issuing read/write requests to another storage system 2. A pair of drive interfaces 211 is connected to the input/output ports 2001 of each drive 201 in the drive enclosure 20.

Each host interface 210 and each drive interface 211 has therein input/output ports 2101, local memory, and a data transfer control unit.

It should be noted that the storage systems 2 may include a plurality of interface enclosures 21. Further, the host interfaces 210 and the drive interfaces 211 may be set in different enclosures.

The maintenance terminal 23 is used to change the configuration of the storage system 2 or check its internal state. Furthermore, it relays instructions from the management terminal 4 to the storage system 2. The maintenance terminal 23 may be connected to the CPU package 220.

A description will be given below of data structures used by the storage systems according to the present invention with reference to FIGS. 3 and 4.

Figure 3:
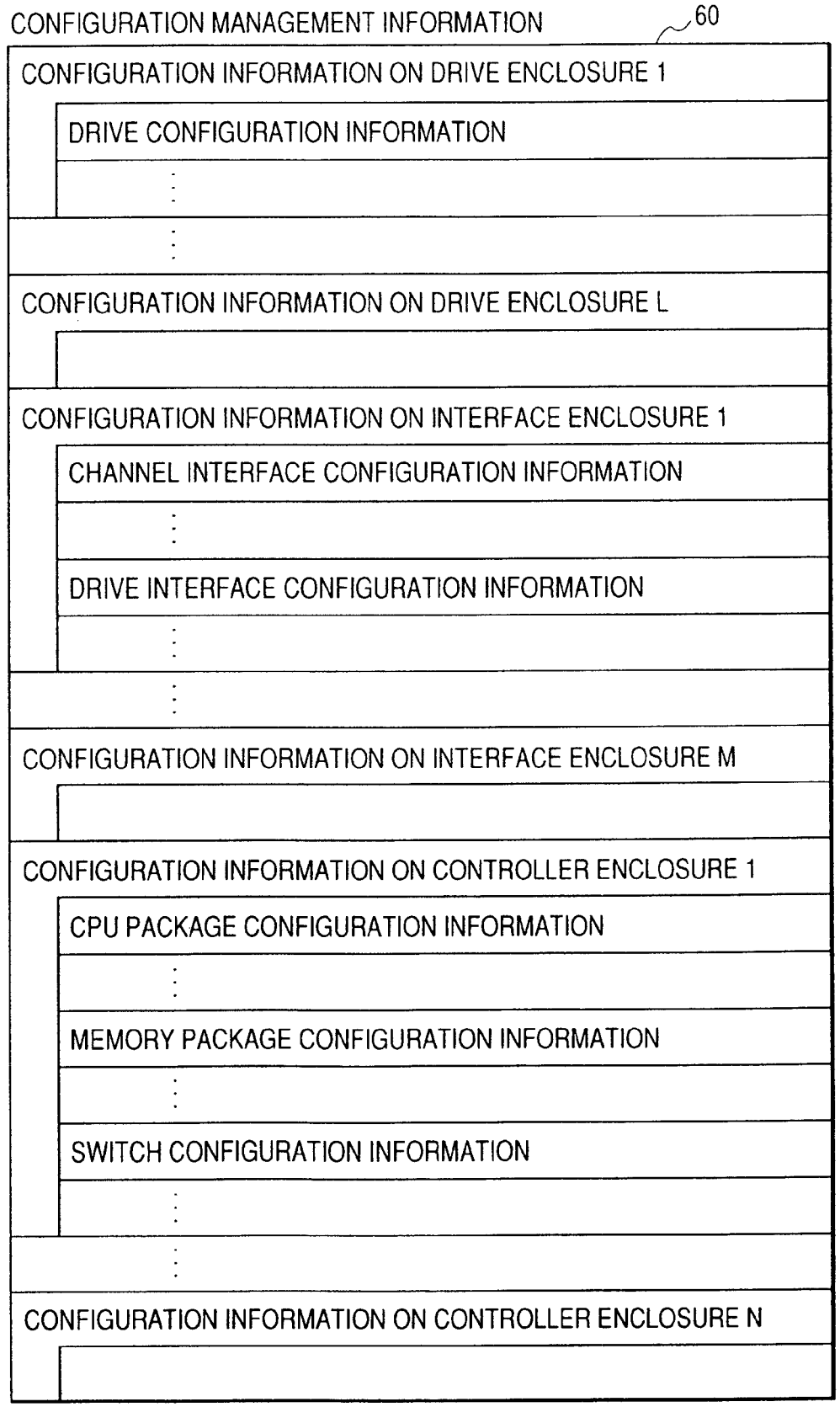
FIG. 3 is a diagram showing configuration management information 60 on each component constituting a storage system 2.

FIG. 3 is a diagram showing configuration management information 60 on each component constituting a storage system 2. FIG. 4A is a diagram showing logical volume management information. FIG. 4B is a diagram showing drive group management information. FIG. 4C is a diagram showing external volume management information.

The configuration management information 60 indicates the states of components such as drive enclosures 20, drives 201 in each drive enclosure 20, interface enclosures 21, host interfaces 210 and drive interfaces 211 in each interface enclosure 21, controller enclosures 22, the CPU package 220, memory package 221, and switches 222 in each controller enclosure 22. Specifically, the configuration management information 60 indicates whether each component is "implemented", "unimplemented", or "preliminarily implemented" which means that the component is prepared for migration. Further, configuration information on each drive 201 includes information for uniquely identifying the drive, for example, information which can be obtained using the SCSI (Small Computer System Interface) Inquiry command, such as a vendor name and a serial number.

Volumes in the storage systems 2 are managed in a hierarchical manner, and this information is stored in the cache memory 223.

The logical volume management information 61 includes, for each logical volume, a logical volume number, a logical volume capacity, a logical volume state, a host definition information list, a drive group number, and an external volume number, as shown in FIG. 4A.

It should be noted that a logical volume is a unit of storage area which a storage system 2 provides to the host computer 1 and other storage systems 2.

The logical volume number identifies the logical volume. The logical volume capacity is the capacity of the logical volume. The logical volume state is set to "normal", "blocked", or "not in use". The host definition information list includes information that allows the logical volume side to identify the host computer 1 which issues read/write requests for the logical volume, such as the name of the host computer 1 and port identifying information. The host definition information list also includes information that allows the host computer 1 side to identify the logical volume for which the host computer 1 issues read/writes requests, such as port identifying information on the storage system 2 and the LUN. The drive group number identifies each drive 201 in the storage system corresponding to the storage area (the logical volume). The external volume number identifies a volume which is implemented in another storage system 2 and corresponds to this logical volume.

When both the drive group number and the external volume number have been set, the logical volume can be accessed as not only a drive of this storage system 2 but also a volume of the another storage system 2 if the drive group and the external volume are both in a normal state.

The drive group management information 62 includes, for each drive group, a drive group number, a drive group capacity, a drive group state, a logical volume number, drive group attribute information, and a drive information list, as shown in FIG. 4B.

A drive group is a group of drives 201 (or a collection of the areas of these drives) and is used when distributing or storing data stored in a logical volume into a plurality of drives—by means of, for example, a RAID (Redundant Array of Independent Disks) technique.

The drive group number identifies the drive group. The drive group capacity is the capacity of the drive group. The drive group state is set to "normal", "blocked", or "not in use". The drive group attribute information includes the corresponding logical volume number and RAID configuration information (the RAID level, the number of data drives, the number of parity drives, the stripe size, etc.) The drive information list includes information on the area of each drive 201 in the drive group, such as the drive number and capacity of the drive 201 and the start address of its area.

The external volume management information includes, for each external volume, an external volume number, an external volume capacity, an external volume state, a logical volume number, external volume attribute information, and an external volume access path list, as shown in FIG. 4C.

It should be noted that an external volume is actually a volume created in another storage system but can be used by this storage system using an external volume number.

The external volume number identifies the external volume. The external volume capacity is the capacity of the external volume. The external volume state is set to "normal", "blocked", or "not in use". The logical volume number is the number of the logical volume corresponding to the external volume. The external volume attribute information includes information for uniquely identifying the external volume, such as the serial number of the another storage system and a volume number in the another storage system. The external volume access path list includes information used to access the external volume, such as port identifying information on this storage system and the another storage system and LUNs.

A description will be given below of a first method for migrating data from one storage system (a source storage system) to another storage system (a target storage system) according to the first embodiment of the present invention with reference to FIGS. 5 to 7.

FIG. 5 is a flowchart of a first process of the first method for migrating data from a source storage system 2a to a target storage system 2b, wherein a drive enclosure 20 containing a drive 201 to be migrated is migrated from the source storage system 2a to the target storage system 2b together with all the drives 201 in the drive enclosure 20.

Figure 6A:
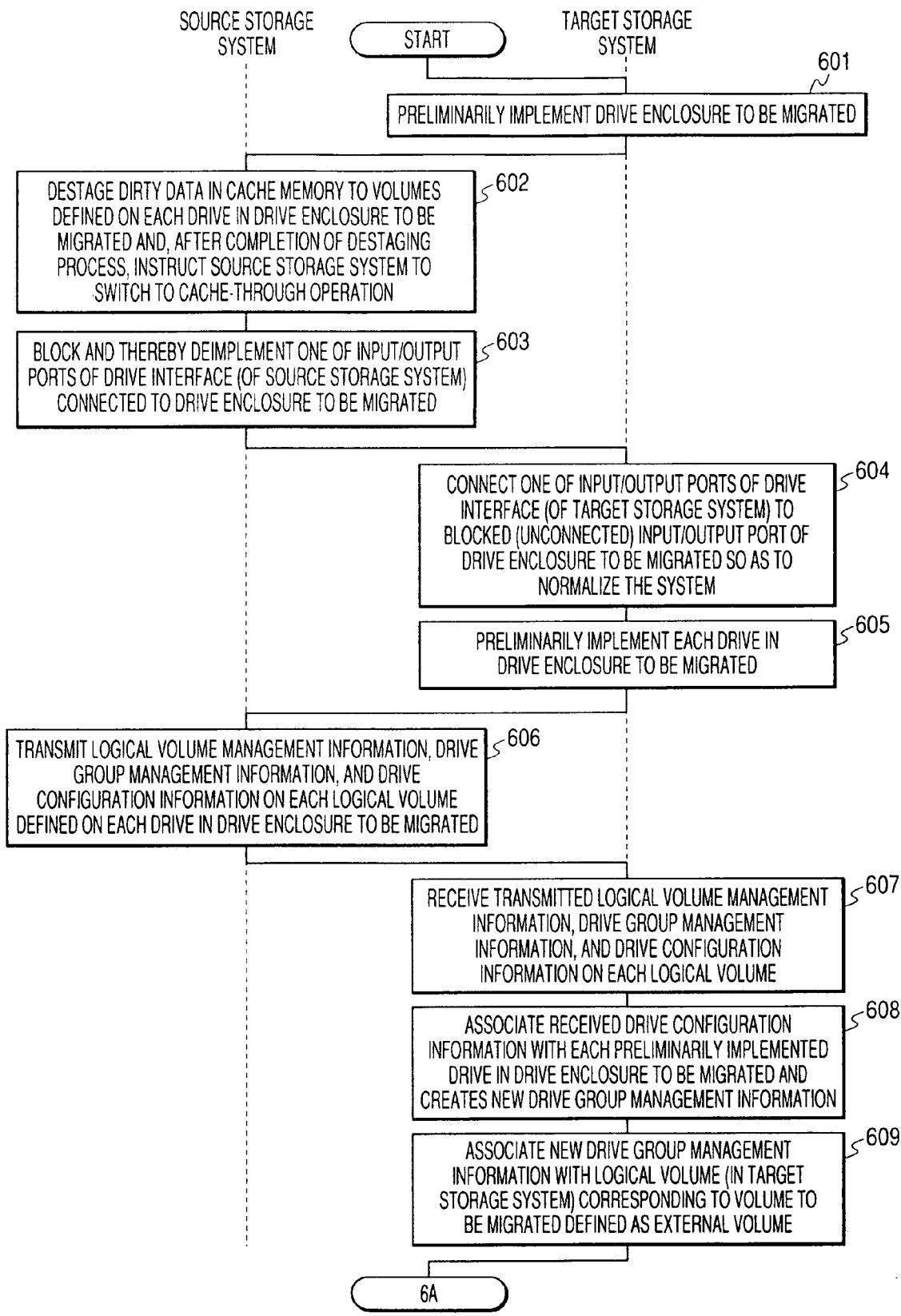
FIG. 6A is a first flowchart of a second process of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20.

FIGS. 6A and 6B are flowcharts of a second process of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20.

Figure 7A:
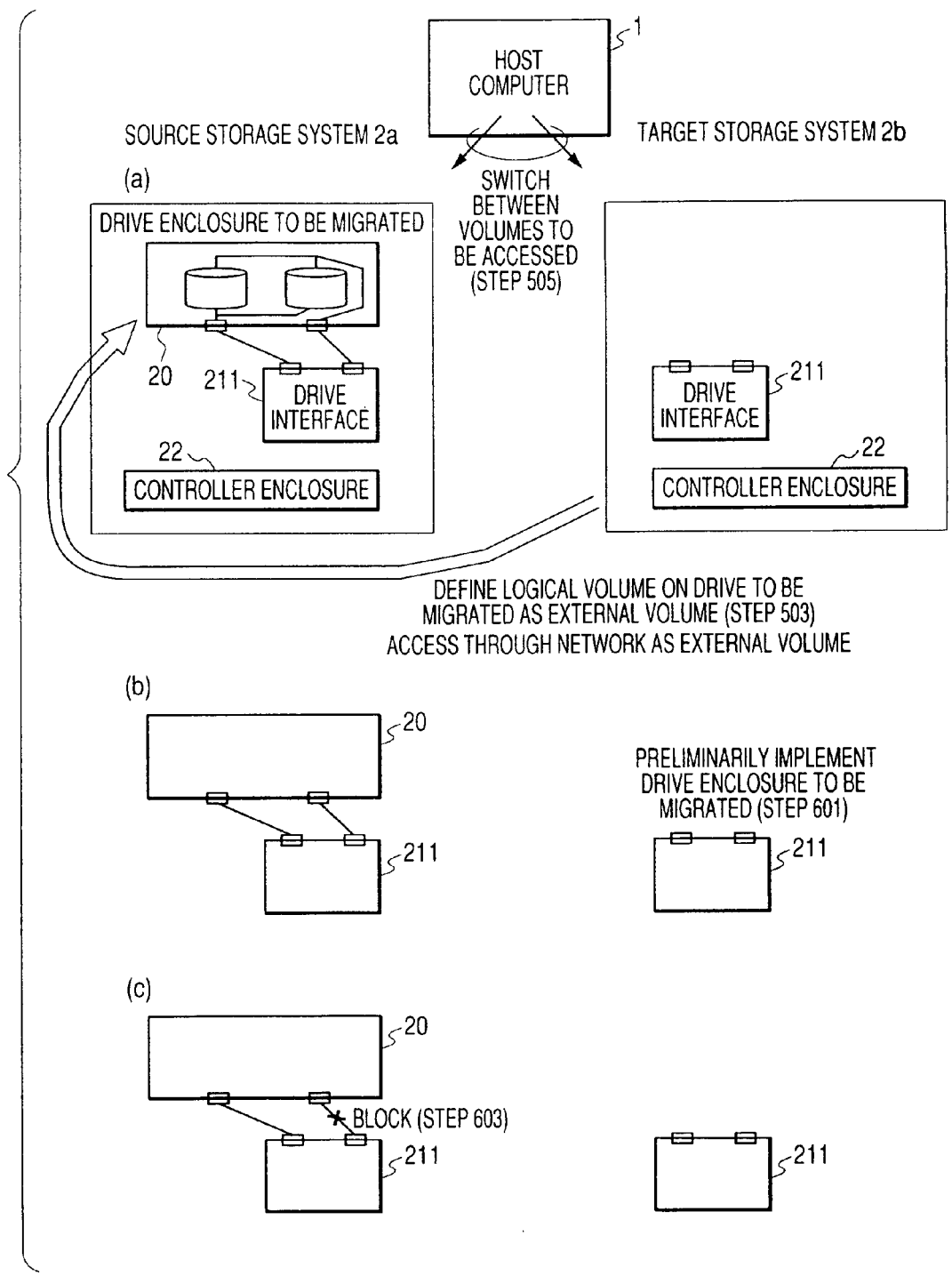
FIG. 7A is a first schematic diagram of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20.

FIGS. 7A and 7B are schematic diagrams of the first method for migrating data from the source storage system 2a to the target storage system 2b, wherein the drive enclosure 20 containing the drive 201 to be migrated is migrated from the source storage system 2a to the target storage system 2b together with all the drives 201 in the drive enclosure 20.

In the first process of the first method in which the drive enclosure 20 containing the drive 201 to be migrated is migrated from the source storage system 2a to the target storage system 2b together with all the drives 201 in the drive enclosure 20, first a logical volume defined on the drive 201 to be migrated in the source storage system 2a is defined as an external volume of the target storage system 2b, as shown in FIG. 5. Then, access by the host computer 1 to the logical volume on the drive 201 to be migrated in the source storage system 2a is replaced by access to the external volume of the target storage system 2b; that is, the host computer 1 accesses the logical volume on the drive 201 to be migrated as the external volume of the target storage system 2b, as shown in FIG. 7A(a).

Each step in FIG. 5 is executed from the management terminal 4, and the source storage system 2a and the target storage system 2b each have a data migration program 54 running thereon.

First, the target storage system 2b is connected to the network apparatus 3 in step 501.

Then, in step 502, a setting is made in the source storage system 2a so as to allow the target storage system 2b to access the source storage system 2a. It should be noted that when access by the target storage system 2b to the source storage system 2a is restricted by the network apparatus 3, the setting of the network apparatus 3 also need to be changed.

Then, the logical volume on the drive to be migrated in the source storage system 2a is defined as an external volume of the target storage system 2b in step 503.

Specifically, the management terminal 4 sends port identifying information on the source storage system 2a, the LUN, etc. (which are used by the host computer 1 to access the source storage system 2a) to the target storage system 2b as information on the logical volume of the drive to be migrated. The target storage system 2b reserves a space for holding new external volume management information 63 and registers the information received from the management terminal 4 with the external volume access path list. Furthermore, the target storage system 2b issues a request for information for identifying the volume to the LUN of the port of the source storage system 2a accessed by the host computer 1, and registers the obtained information as external volume attribute information. The target storage system 2b also makes an inquiry to the source storage system 2a about the capacity of the volume and registers it as an external volume capacity. Then, the target storage system 2b sets the external volume state to "blocked".

Then, in the target storage system 2b, an empty logical volume is assigned to the logical volume on the drive to be migrated (which has been defined as the external volume), and a path from the host computer 1 is defined so as to allow the host computer 1 to access the volume, in step 504.

Specifically, Step 504 reserves a space for holding new logical volume management information 61, sets the logical volume capacity and the external volume number, and stores information for identifying the host computer 1, port identifying information for accessing the logical volume, the LUN, etc. with the host definition information list in order to allow the host computer 1 to access the logical volume of the target storage system 2b (the host computer 1 currently accesses the logical volume on the drive to be migrated in the source storage system 2a). Furthermore, the states of the logical volume of the target storage system 2b and the external volume to which the logical volume is assigned are set to "normal".

Then, the virtual management program 51 switches the volume to be accessed by the host computer 1 from the logical volume on the drive to be migrated in the source storage system 2a to the newly assigned logical volume of the target storage system 2b in step 505.

The virtual management program 51 switches these volumes transparently to the application program 50. When the application program 50 has issued a request using the path at the time of switching the volumes, the request is processed according to the function of the virtual management program 51 and the conditions under which the input/output command from the application program 50 has been executed, as follows:

(1) Each request currently being processed is handled by the source storage system 2a, and a newly received request which has not yet been processed is transferred to the target storage system 2b.

(2) Each request currently being processed is handled by the source storage system 2a, and a newly received request which has not yet been processed is held within the virtual management program 51. Then, after all previous requests have been processed, the virtual management program 51 switches the volumes to be accessed and transfers the held new request to the target storage system 2b.

(3) The virtual management program 51 terminates all requests with an error and then switches the paths so that the retried requests will be issued to the path to the target storage system 2b.

Lastly, Step 506 invalidates the path definition from the host computer 1 to the logical volume on the drive 201 to be migrated in the source storage system 2a and further invalidates the path definition to the other volumes (which are not targeted for data migration) on the drive(s) 201 to be migrated, and then processing ends.

In the second process of the first method in which the drive enclosure 20 containing the drive 201 to be migrated is migrated from the source storage system 2a to the target storage system together with all the drives 201 in the drive enclosure, the drives 201 in the drive enclosure 20 are disconnected from input/output ports 2111 of the drive interface in the source storage system 2a and then connected to input/output ports 2111 of the drive interface in the target storage system 2b one after another. Then, after the above step, the drive enclosure 20 is reimplemented in the target storage system 2b.

The present embodiment assumes that each drive in the drive enclosures and each drive interface has a plurality of input/output ports 2111. The reason that each drive in the drive enclosures and each drive interface has a plurality of input/output ports 2111 is to employ a multiplexed path so as to enhance reliability.

Each step in FIGS. 6A and 6B is executed from the management terminal 4, and the source storage system 2a and the target storage system 2b each have a data migration program 54 running thereon.

First, the drive enclosure 20 containing the drive 201 to be migrated is preliminarily implemented in the target storage system 2b in step 601, as shown in FIGS. 6A and 7A(b). Specifically, step 601 reserves a space for holding new drive enclosure configuration information and sets the value "preliminarily implemented". It should be noted that when a plurality of drive enclosures 20 are connected to the input/output ports 2111 of the drive interface 211 through which the drive to be migrated is accessed, the above preliminary implementation operation is performed on each of the plurality of drive enclosures 20 in order to migrate these drive enclosures 20 to the target storage system 2b at the same time.

Then, in step 602, dirty data in the cache memory 223 is destaged to a volume(s) defined on each drive 201 in the drive enclosure 20 to be migrated. It should be noted that dirty data is data in a cache memory which has not yet been saved, or written back, to the drive side; that is, the data has not yet been reflected in the drive side. After the above destaging process, the source storage system 2a is instructed to switch to "cache-through" operation (in which a data change is always reflected in both the cache memory and a target drive.

The above step is performed to ensure the consistency of the data on the drive to be migrated in steps 608 and 609 after read/write requests from the host computer 1 are processed.

Then, in the source storage system 2a, one of the input/outputs ports 2111 of the drive interface 211 connected to the drive enclosure 20 to be migrated is blocked and thereby deimplemented in step 603, as shown in FIG. 7A(c).

The volume on the drive to be migrated can still be accessed through the other input/output port 2111 of the drive interface 211 which has not been blocked.

Then, in step 604, one of the input/output ports 2111 of the drive interface 211 of the target storage system 2b is connected to the blocked input/output port 2001 of the drive enclosure 20 to be migrated, forming a path through which the drive enclosure 20 can be accessed from the drive interface 211, as shown in FIG. 7B(a). In the example shown in FIGS. 7A and 7B, the drive interface 211 in the target storage system 2b is prepared beforehand.

Then, each drive 201 in the drive enclosure 20 to be migrated is preliminarily implemented in the target storage system 2b in step 605, as shown in FIG. 7B(a). Specifically, step 605 reserves a space for holding new drive configuration information for each drive 201 to be preliminarily implemented, obtains information for identifying the drive 201, such as its manufacturer and serial number, and stores the obtained information in a drive configuration information table. At this point, each drive 201 in the drive enclosure 20 to be migrated is fully implemented in the source storage system 2a and preliminarily implemented in the target storage system 2b.

Then, the source storage system 2a transmits drive configuration information, logical volume management information 61, and drive group management information 62 on each drive 201 in the drive enclosure 20 to be migrated to the management terminal 4 in step 606, as shown in FIG. 7B(a).

The management terminal 4, in turn, transmits the received drive configuration information, logical volume management information 61, and drive group management information 62 on each drive 201 to the target storage system 2b.

Then, in step 607, the target storage system 2b receives the drive configuration information, logical volume management information 61, and drive group management information 62 on each drive 201 sent from the management terminal 4.

Then, in step 608, the target storage system 2b associates each preliminarily implemented drive 201 with the drive configuration information transmitted from the source storage system 2a through the management terminal (identifies each preliminarily implemented drive 201), reserves a space for holding new drive group management information 62, and creates the new drive group management information 62 based on the drive group management information 62 obtained from the source storage system 2a. Specifically, the target storage system 2b determines the drive group capacity, the drive group attribute information, and each start address and capacity in the drive information list based on the drive group management information 62 obtained from the source storage system 2a. Further, the target storage system 2b sets the drive group state to "blocked".

Further, in step 609, the target storage system 2b associates the logical volume of the target storage system 2b corresponding to the logical volume on the drive to be migrated with the corresponding logical volume management information 61 obtained from the source storage system 2a (identifies the logical volume of the target storage system 2b) and newly sets the drive group number in the logical volume management information. The target storage system 2b then sets the drive group state in the drive group management information 62 to "normal".

At this point, the source storage system 2a has already started cache-through operation on the volume defined on each drive 201 in the drive enclosure 20 to be migrated. Therefore, even though the logical volume on the drive to be migrated in the source storage system 2a is redefined as both an external volume and a volume on a preliminarily implemented drive group on the target storage system 2b side and read/write operations are performed according to these two definitions, the data on the drive to be migrated can be made consistent with the corresponding data in the cache memory in the target storage system 2b by operating the data exclusively in the cache memory at the storage system 2b, allowing the processing to be carried out without interruption.

Referring now to FIG. 6B, in step 610, the target storage system 2b invalidates the external volume definition of the logical volume defined on the drive 201 to be migrated (the logical volume is associated with a logical volume of the target storage system 2b), as show in FIG. 7B(b). Specifically, the target storage system 2b deletes the external volume number from the logical volume management information 61 and sets the (external volume) state in the external volume management information 63 corresponding to the external volume number to "not in use".

Then, in step 611, the source storage system 2a blocks and thereby deimplements the logical volume defined on each drive 201 in the drive enclosure 20 to be migrated. At this point, the drive to be migrated is accessed based on the new drive group management information 62 set in the target storage system 2b.

Then, in step 612, the source storage system 2a blocks and thereby deimplements the other one of the input/output ports 2111 of the drive interface 211 connected to the drive enclosure 20 to be migrated.

Then, in step 613, the other input/output port 2111 of the drive interface 211 in the target storage system 2b is connected to the other input/output port 2001 (the blocked input/output port 2001) of the drive enclosure 20 to be migrated, forming a path through which the drive enclosure 20 can be accessed from the drive interface 211, as shown in FIG. 7B(c).

Then, each drive 201 in the drive enclosure 20 to be migrated is fully implemented in the target storage system 2b in step 614, as shown in FIG. 7B(d).

Then, the drive enclosure 20 to be migrated is deimplemented from the source storage system 2a in step 615, as shown in FIG. 7B(d).

Lastly, the drive enclosure 20 to be migrated is fully implemented in the target storage system 2b in step 616, as shown in FIG. 7B(d), and processing ends.

A description will be given below of a second method for migrating data from on storage system (a source storage system) to another storage system (a target storage according to the first embodiment of the present invention with reference to FIGS. 8A and 8B.

Figure 8A:
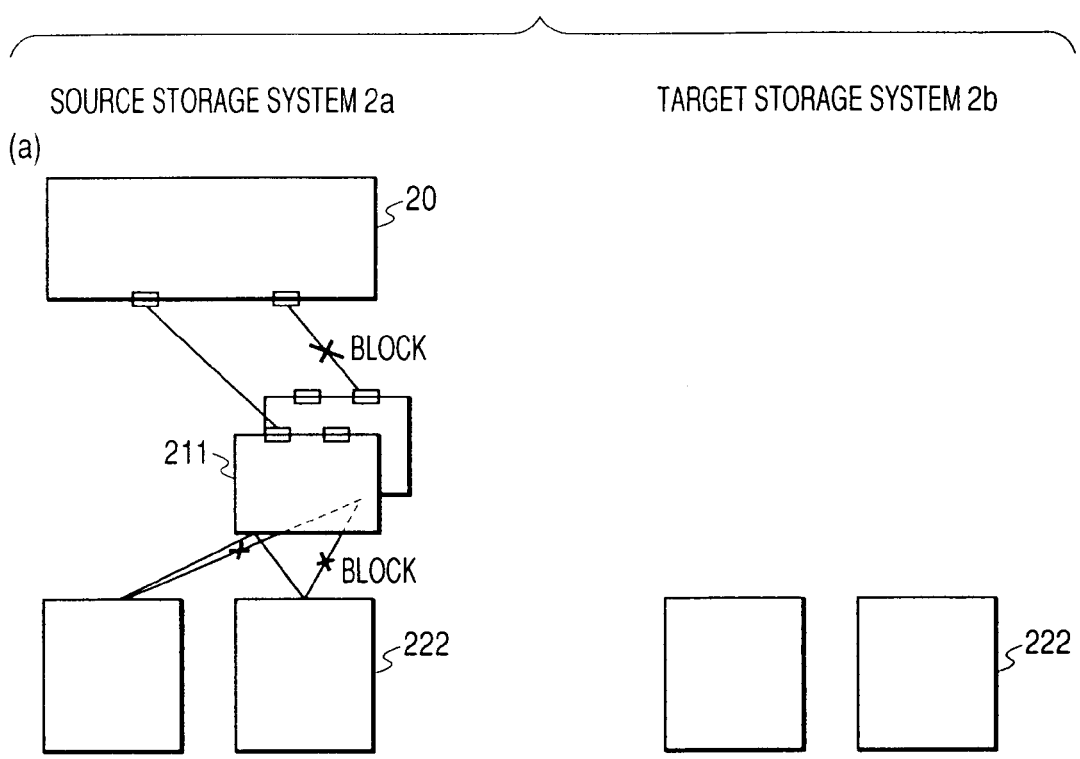
FIG. 8A is a first schematic diagram of a second method for migrating data from the source storage system 2a to the target storage system 2b, wherein the drive enclosure 20 containing the drive 201 to be migrated and a drive interface 211 connected to the drive enclosure 20 are migrated from the source storage system 2a to the target storage system 2b together with all the drives 201 in the drive enclosure 20.
Figure 8B:
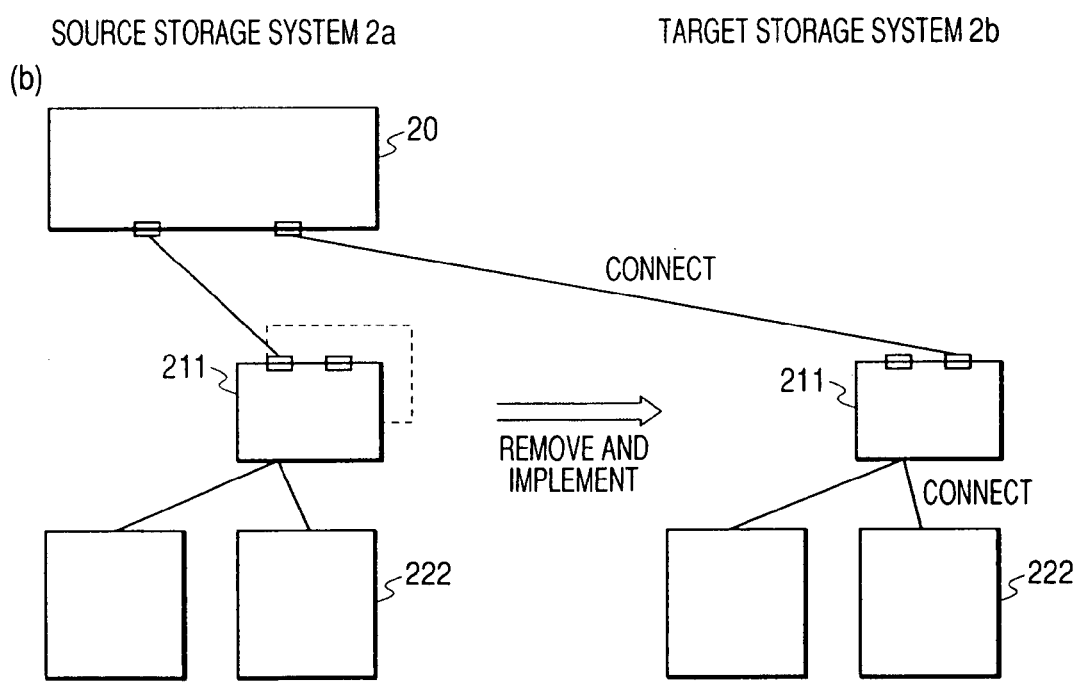
FIG. 8B is a second schematic diagram of the second method for migrating data from the source storage system 2a to the target storage system 2b, wherein the drive enclosure 20 containing the drive 201 to be migrated and the drive interface 211 connected to the drive enclosure 20 are migrated from the source storage system 2a to the target storage system 2b together with all the drives 201 in the drive enclosure 20.

FIGS. 8A and 8B are schematic diagrams of the second method for migrating data from the source storage system 2a to the target storage system 2b, wherein the drive enclosure 20 containing a drive 201 to be migrated and a drive interface 211 connected to the drive enclosure 20 are migrated from the source storage system 2a to the target storage system 2b together with all the drives 201 in the drive enclosure 20.

It should be noted that the first method connects the drive enclosure 20 to be migrated with the drive interface 211 prepared in the target storage system 2b beforehand. The second method, on the other hand, migrates not only the drive enclosure 20 to be migrated but also the drive interface 211 connected to the drive enclosure 20 to the target storage system 2b; they are reimplemented and used in the target storage system 2b.

It should be noted that the second method will be described below focusing on the differences from the first method and on important steps for migrating from the source storage system 2a to the target storage system 2b.

In this case, a pair of drive interfaces 211 (a drive interface pair) are connected to the drive enclosure 20 to be migrated, as in the configuration shown in FIG. 2. Further, each drive interface 211 is connected to two switches 222, as shown in FIG. 8A.

As shown in FIG. 8A, the second method blocks an input/output port 2111 of one of the pair of drive interfaces 211 (the input/output port 2111 being currently connected to the drive enclosure 20) in step 603 shown in FIG. 6A. The second method also disconnects the drive interface 211 from the switches 222.

Then, the disconnected drive interface 211 is removed from the source storage system 2a and implemented in the target storage system 2b. After that, as shown in FIG. 8B(b), an input/output port 2111 of the implemented drive interface 211 is reconnected to the blocked (unconnected) input/output port 2001 of the drive enclosure to be migrated, forming a path. Furthermore, the implemented drive interface 211 is connected to two switches 222 in the target storage system 2b. Then, the second method performs steps similar to step 605 and later steps of the first method shown in FIG. 6A.

Thus, when the source storage system 2a includes a plurality of drive interfaces 211, one of them may be removed from the source storage system 2a and reused in the target storage system 2b.

A description will be given below of a third method for migrating data from one storage system (a source storage system) to another storage system (a target storage system) according to the first embodiment of the present invention with reference to FIGS. 9 and 10A to 10C.

FIG. 9 is a flowchart of the third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21.

Figure 10C:
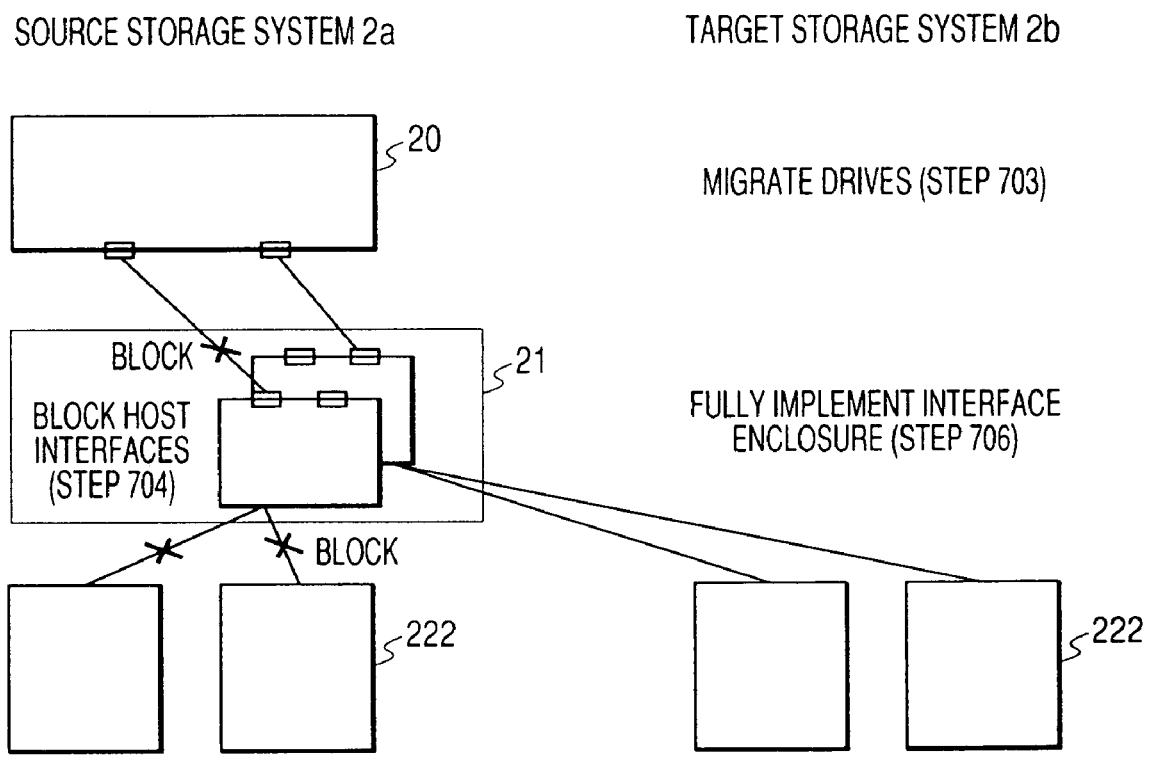
FIG. 10C is a third schematic diagram of the third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21.

FIGS. 10A to 10C are schematic diagrams of the third method for migrating data from the source storage system 2a to the target storage system 2b, wherein the drive enclosure 20 containing the drive 201 to be migrated and the interface enclosure 21 connected to the drive enclosure 20 are migrated from the source storage system 2a to the target storage system 2b together with all the drives 201 in the drive enclosure 20 and all the drive interfaces in the interface enclosure 21.

It should be noted that to migrate data from the source storage system 2a to the target storage system 2b, the second method migrates the drive enclosure 20 to be migrated and a drive interface 211 connected to the drive enclosure 20 to the target storage system 2b together with all the drives in the drive enclosure 20. The third method, on the other hand, migrates the interface enclosure 21 containing the drive interface 211 connected to the drive enclosure 20 together with all the drive interfaces therein, instead of only the target drive interface 211.

It should be further noted that the third method will be described below focusing on the differences from the first and second methods and on important steps for migrating from the source storage system 2a to the target storage system 2b.

Unlike FIGS. 8A and 8B, FIGS. 10A to 10C show the interface enclosure 21 to be migrated.

As shown in FIG. 10A, the third method blocks an input/output port 2111 of one of the pair of drive interfaces 211 (the input/output port 2111 being currently connected to the drive enclosure 20 to be migrated) in step 603 shown in FIG. 6A. The third method also disconnects the drive interfaces 211 from the switches 222. These steps are the same as the corresponding steps of the second method.

However, unlike the second method, the third method does not remove the disconnected drive interface 211 from the source storage system 2a. Instead, the third method reconnects the blocked (disconnected) input/output port 2111 of the drive interface 211 to the blocked (disconnected) input/output port 2001 of the drive enclosure to be migrated and further connects the drive interface 211 to two switches 222 in the target storage system 2b, forming a path, as shown in FIG. 10B.

Then, the interface enclosure 21 may be migrated to the target storage system 2b after migrating the drive enclosure and each drive therein.

Thus, when the interface enclosure 21 in the source storage system 2a connected to the drive enclosure to be migrated contains a plurality of drive interfaces 211, some of them may be used to form a path through which each drive in the drive enclosure to be migrated can be accessed from the target storage system 2b. Then, the interface enclosure 21 may be migrated to the target storage system 2b after migrating each drive.

Each step in FIGS. 10A to 10C is executed from the management terminal 4, and the source storage system 2a and the target storage system 2b each have a data migration program 54 running thereon.

First, the interface enclosure 21 to be migrated is preliminarily implemented in the target storage system 2b in step 701.

Step 702 determines whether all drive interfaces 211 in the interface enclosure 21 to be migrated have been migrated from the source storage system 2a to the target storage system 2b.

If no (the NO branch from step 702), then a pair of drive interfaces 211, the drive enclosure 20 connected the pair of drive interfaces 211, and each drive 201 in the drive enclosure 20 are migrated from the source storage system 2a to the target storage system 2b in step 703.

The processing in step 703 is almost the same as that shown in FIGS. 6A and 6B with the difference that in step 703, the drive interface 211 deimplemented from the source storage system 2a is used in the target storage system 2b. Further, step 703 is different from the corresponding step of the second method in that step 703 connects the drive interface 211 to switches 222 in the target storage system 2b without removing it from the interface enclosure 21.

That is, in the source storage system 2a, an input/output port 2111 of one of the pair of drive interfaces 211 is blocked (the input/output port 2111 being currently connected to the drive enclosure 20 to be migrated) and furthermore the drive interface 211 is also disconnected from the switches 222, as shown in FIG. 10A. Then, the drive interface 211 deimplemented from the source storage system 2a is connected to the drive enclosure to be migrated again and further connected to switches 222 in the target storage system 2b without removing it from the interface enclosure 21, as shown in FIG. 10B.

After that, the other drive interface 211 is disconnected from the drive enclosure to be migrated and switches in the source storage system 2a, as shown in FIG. 10C.

It should be noted that the drive interface 211 deimplemented from the source storage system 2a may be connected to the target storage system 2b using the expansion ports of switches 222 in the controller enclosure 22 of the target storage system 2b. Processing then proceeds to step 704.

On the other hand, if all the drive interfaces 211 in the interface enclosure 21 to be migrated have been migrated from the source storage system 2a to the target storage system 2b (the YES branch from step 702), then processing proceeds directly to step 704.

Then, in the source storage system 2a, the host interfaces 210 in the interface enclosure 21 to be migrated are blocked and thereby deimplemented in step 704.

After that, the interface enclosure 21 to be migrated is deimplemented from the source storage system 2a in step 705.

Lastly, the interface enclosure 21 to be migrated is fully implemented in the target storage system 2b in step 706, and processing ends.

A description will be given below of a fourth method for migrating data from on storage system (a source storage system) to another storage system (a target storage system) according to the first embodiment of the present invention with reference to FIGS. 11 and 12A to 12C.

Specifically, the fourth method migrates data from the source storage system 2a to the target storage system 2b in such a way that the drive enclosure 20 containing the drive 201 to be migrated and the interface enclosure 21 and the switches 222 in the controller enclosure which are connected to the drive enclosure 20 are migrated from the source storage system 2a to the target storage system 2b together with all the drive 201 in the drive enclosure 20 and all the drive interfaces in the interface enclosure 21.

FIG. 11 is a flowchart of the fourth method for migrating data from the source storage system 2a to the target storage system 2b, wherein the drive enclosure 20 containing the drive 201 to be migrated and the interface enclosure 21 and the switches 222 in the controller enclosure 22 which are connected to the drive enclosure 20 are migrated from the source storage system 2a to the target storage system 2b together with all the drive 201 in the drive enclosure 20 and all the drive interfaces in the interface enclosure 21.

Figure 12A:
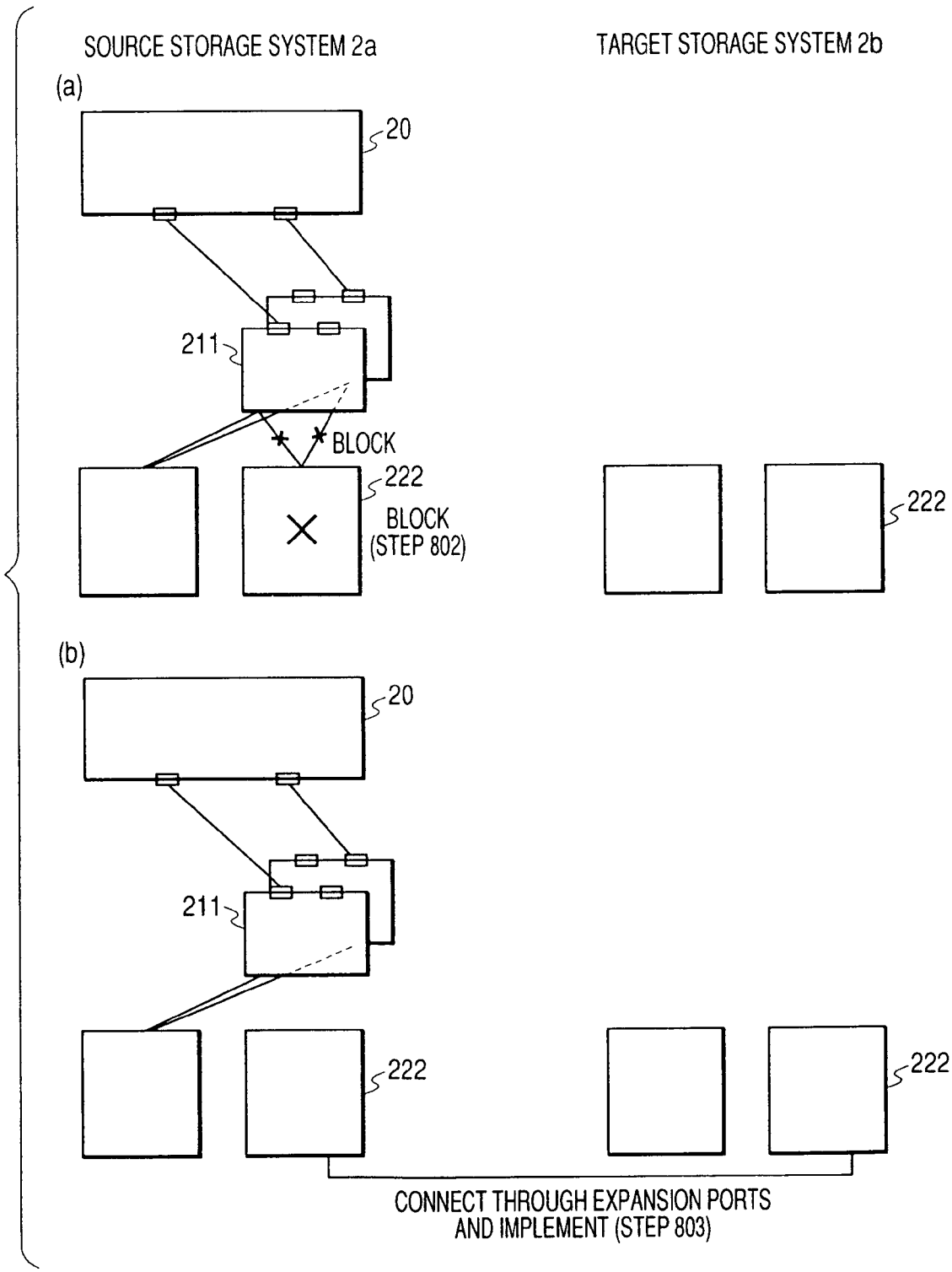
FIG. 12A is a first schematic diagram of the fourth method for migrating data from the source storage system 2a to the target storage system 2b, wherein the drive enclosure 20 containing the drive 201 to be migrated and the interface enclosure 21 and the switches 222 in the controller enclosure 22 which are connected to the drive enclosure 20 are migrated from the source storage system 2a to the target storage system 2b together with all the drives 201 in the drive enclosure 20 and all the drive interfaces in the interface enclosure 21.
Figure 12B:
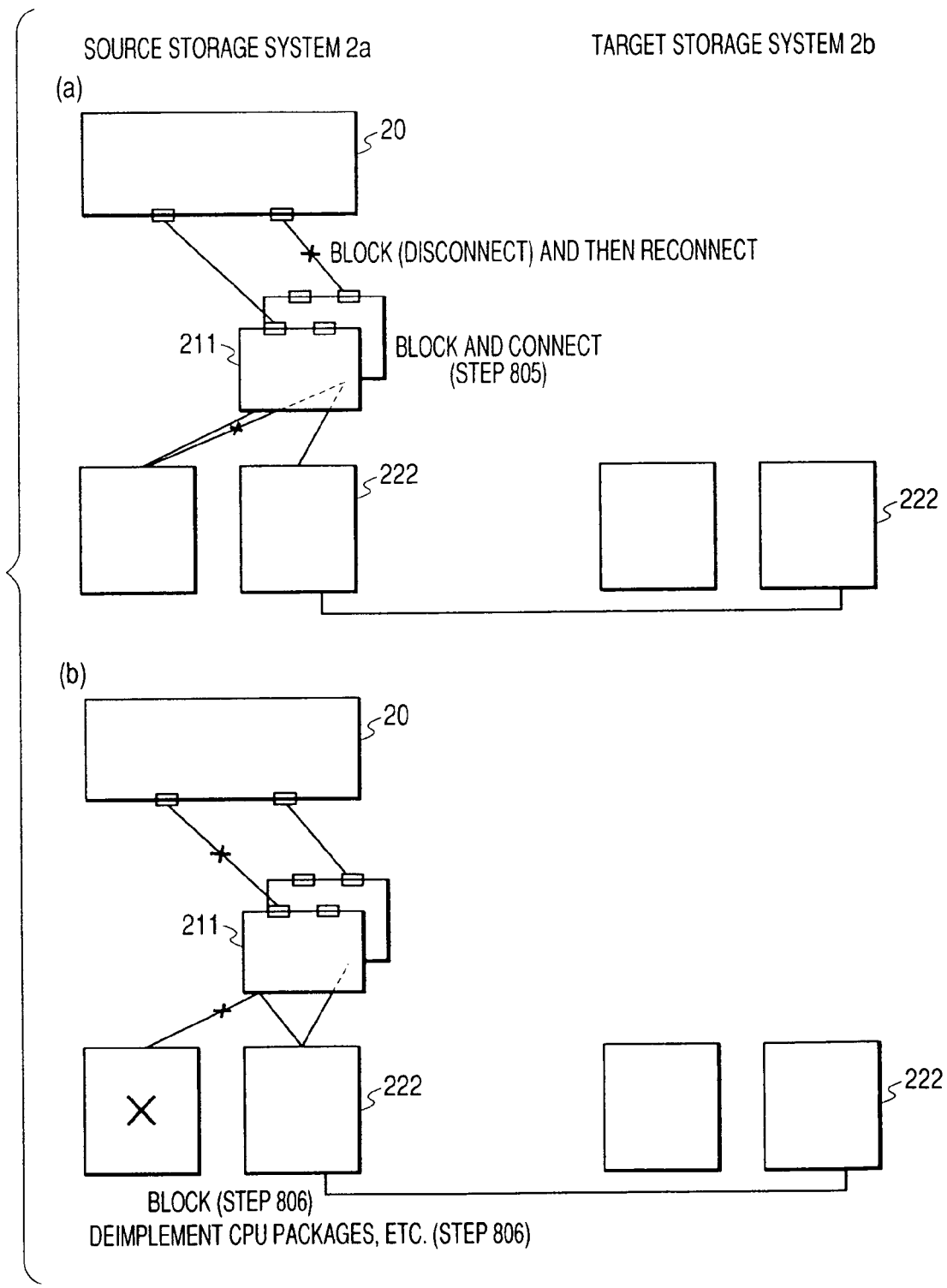
FIG. 12B is a second schematic diagram of the fourth method for migrating data from the source storage system 2a to the target storage system 2b, wherein the drive enclosure 20 containing the drive 201 to be migrated and the interface enclosure 21 and the switches 222 in the controller enclosure 22 which are connected to the drive enclosure 20 are migrated from the source storage system 2a to the target storage system 2b together with all the drives 201 in the drive enclosure 20 and the all the drive interfaces in the interface enclosure 21.
Figure 12C:
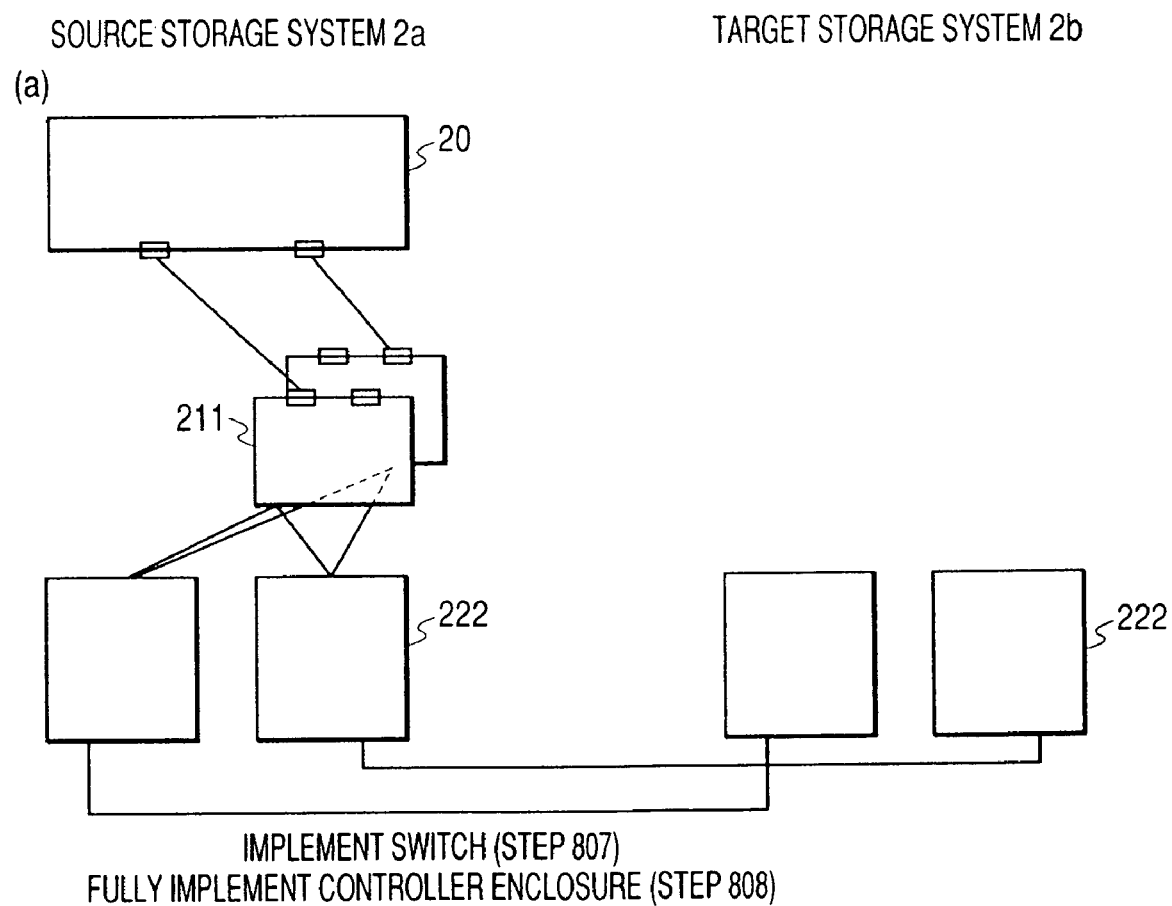
FIG. 12C is a third schematic diagram of the fourth method for migrating data from the source storage system 2a to the target storage system 2b, wherein the drive enclosure 20 containing the drive 201 to be migrated and the interface enclosure 21 and the switches 222 in the controller enclosure 22 which are connected to the drive enclosure 20 are migrated from the source storage system 2a to the target storage system 2b together with all the drives 201 in the drive enclosure 20 and all the drive interfaces in the interface enclosure 21.

FIGS. 12A to 12C are schematic diagrams of the fourth method for migrating data from the source storage system 2a to the target storage system 2b, wherein the drive enclosure 20 containing the drive 201 to be migrated and the interface enclosure 21 and the switches 222 in the controller enclosure 22 which are connected to the drive enclosure 20 are migrated from the source storage system 2a to the target storage system 2b together with all the drives 201 in the drive enclosure 20 and all the drive interfaces in the interface enclosure 21.

Each step in FIG. 11 is executed from the management terminal 4, and the source storage system 2a and the target storage system 2b each have a data migration program 54 running thereon.

First, the controller enclosure 22 to be migrated is preliminarily implemented in the target storage system 2b in step 801.

Then, in the source storage system 2a, one of the pair of switches 222 in the controller enclosure 22 is blocked and thereby deimplemented in step 802, as shown in FIG. 12A(a). Since two switches are originally implemented in the controller enclosure 22 in each storage system 2, the system can continue to operate even after one of them is blocked.

Then, the blocked switch 222 is implemented in the target storage system 2b by connecting between the blocked switch 222 and a switch 222 of the target storage system 2b through their expansion ports 224 in step 803, as shown in FIG. 12A(b).

Step 804 determines whether all interface enclosures 21 implemented for the controller enclosure 22 to be migrated have been migrated from the source storage system 2a to the target storage system 2b.

If no (the NO branch from step 804), then a pair of drive interfaces 211 in each interface enclosure 21, the drive enclosure 20 connected to the pair of drive interfaces 211, and each drive 201 in the drive enclosure 20 are migrated from the source storage system 2a to the target storage system 2b in step 805, as shown in FIG. 12B(a).

The processing in step 805 is almost the same as that shown in FIGS. 6A and 6B with the difference that in step 805, the drive interface 211 deimplemented from the source storage system 2a is used in the target storage system 2b, as in step 703 shown in FIGS. 8A and 8B.

It should be noted that the drive interface 211 deimplemented from the source storage system 2a may be connected to the target storage system 2b using the expansion ports 224 of switches 222 in the controller enclosure 22 of the source storage system 2a. Processing then proceeds to step 806.

On the other hand, if all interface enclosures 21 have been migrated from the source storage system 2a to the target storage system 2b (the YES branch from step 804), then processing proceeds directly to step 806.

Then, as shown in FIG. 12B(b), all CPU packages 220, all memory packages 221, and the other one of the pair of switches 222 in the controller enclosure in the source storage system 2a are blocked and thereby deimplemented in step 806, causing the source storage system 2a to cease to operate.

Then, the other one of the pair of switches 222 in the controller enclosure 22 to be migrated is implemented in the target storage system 2b in step 807, as shown in FIG. 12C(a).

Lastly, the controller enclosure 22 to be migrated is fully implemented in the target storage system 2b in step 808, as shown in FIG. 12C(a). Then, the drive to be migrated is connected to a drive interface 211 in the target storage system 2b, and processing ends.

A description will be given below of the input/output operation of each storage system with reference to FIGS. 13 and 14.

Data stored in a storage system is read out by the read program 52 loaded into the local memory in its CPU package. The read program 52 is executed by the CPU in the CPU package 220.

Figure 13:
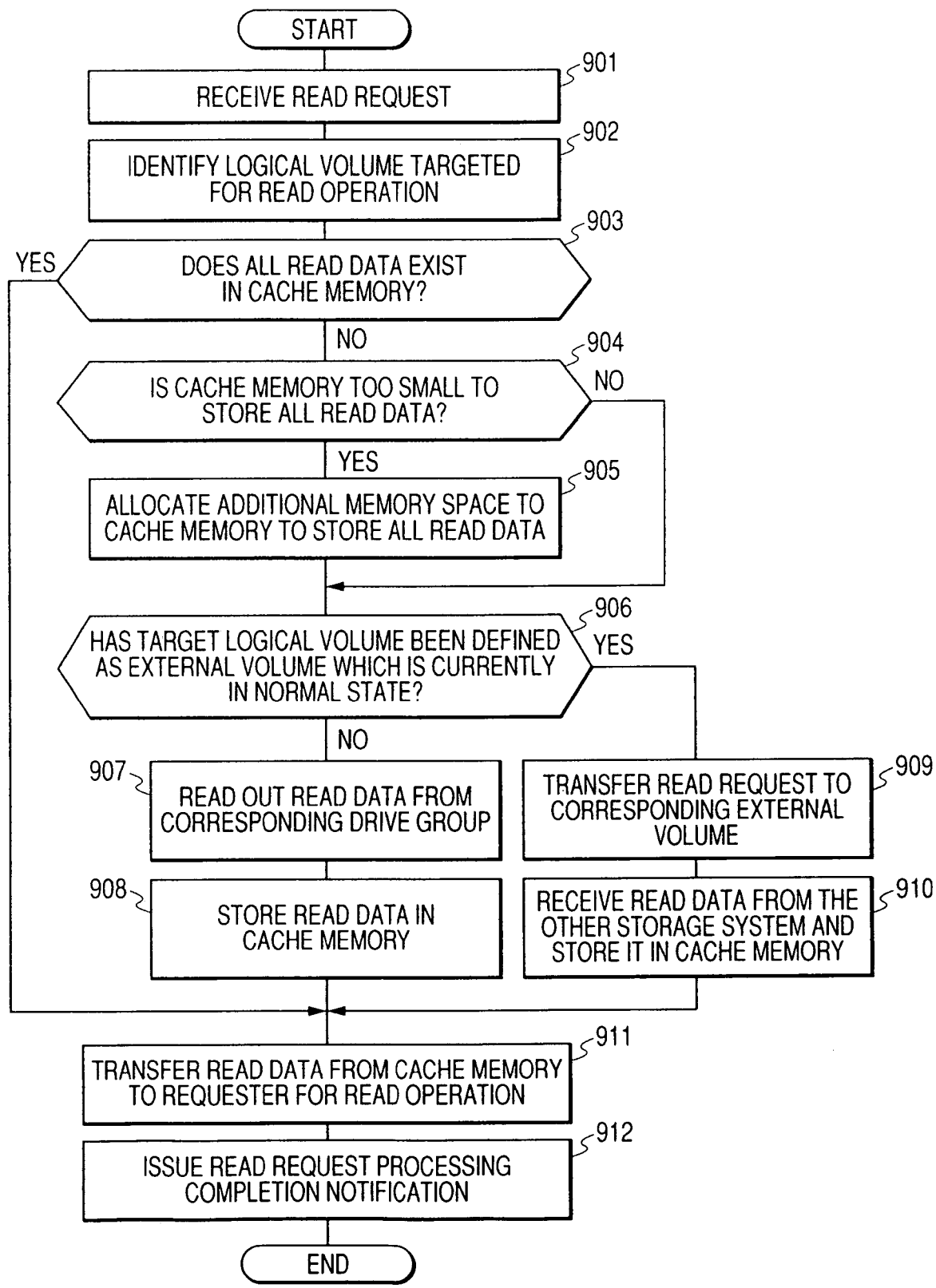
FIG. 13 is a flowchart of the processing procedure performed by read programs 52 executed in the source storage system 2a and the target storage system 2b.

FIG. 13 is a flowchart of the processing procedure performed by the read program 52 executed in the source storage system 2a or the target storage system 2b.

First, the read program 52 receives a read request from the host computer 1 or another storage system in step 901 and identifies the logical volume targeted for the read operation in step 902.

Then, the read program 52 determines whether all read data is present in the cache memory 223 in step 903.

If yes (the YES branch from step 903), then processing proceeds directly to step 911.

If no (the NO branch from step 903), then in step 904 the read program 52 determines whether the cache memory 223 space allocated to the read data is too small to store all read data.

If the cache memory 223 space allocated to the read data is large enough (the NO branch from step 904), then processing proceeds directly to step 906.

If, on the other hand, the cache memory 223 space allocated to the read data is too small (the YES branch from step 904), then in step 905 an additional memory space is allocated to the cache memory 223 to store all read data.

Then, in step 906, the read program 52 determines whether the logical volume targeted for the read operation has been defined as an external volume which is currently in a normal state. That is, it is determined whether the logical volume management information 61 on the logical volume includes an external volume number and furthermore the external volume state in the external volume management information 63 including the same external volume number is set to "normal".

If the logical volume targeted for the read operation has not been defined as an external volume which is currently in a normal state (the NO branch from step 906), then the read program 52 identifies the corresponding drive 201 based on the drive information list in the drive group management information 62 (on the drive group) corresponding to the logical volume, and reads out the read data from it in step 907. The read program 52 then stores the read data in the cache memory 223 in step 908. Processing then proceeds to step 911.

If the logical volume targeted for the read operation has been defined as an external volume which is currently in a normal state (the YES branch from step 906), then the read program 52 transfers the read request to the external volume specified by the external volume management information 63 associated with the logical volume in step 909. The read program 52 then receives the read data from the another storage system 2 for which the external volume has been defined, and stores the read data in the cache memory 223 in step 910. Processing then proceeds to step 911.

It should be noted that if the logical volume has been associated with both an external volume and a drive group which are currently in a normal state, the drive group may be accessed in preference to the external volume, which is not the case in steps 906 to 911. Further, the load on each access route may be measured when the read request has been received and the access route under lower load conditions may be selected.

Then, the read data is transferred from the cache memory 223 to the requester for the read operation in step 911. Lastly, the read program 52 sends a read request processing completion notification to the requester for the read operation in step 912, and then processing ends.

On the other hand, the read request transferred in step 909 is received by the source storage system 2a for which the external volume has been defined. The received read request is processed in the same manner as in the above steps shown in FIG. 13. However, in the source storage system 2a, the drive group is selected to be accessed (the NO branch from step 906), and the read data is read out from it in steps 907 and 908.

Data is written to a storage system by the write program 53 loaded into the local memory in its CPU package. The write program 53 is executed by the CPU in the CPU package 220.

Figure 14:
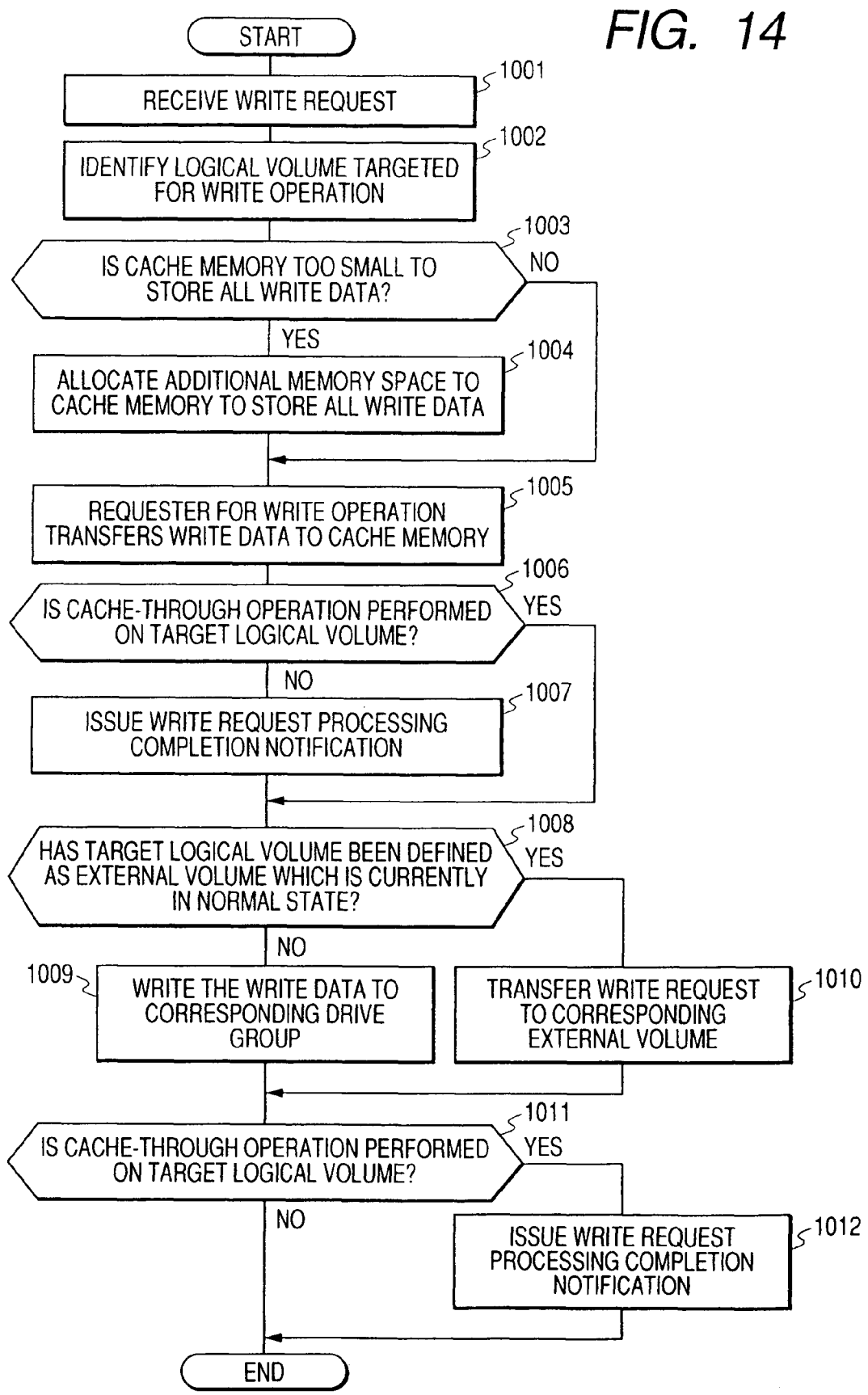
FIG. 14 is a flowchart of the processing procedure performed by write programs 53 executed in the source storage system 2a and the target storage system 2b.

FIG. 14 is a flowchart of the processing procedure performed by the write program 53 executed in the source storage system 2a or the target storage system 2b.

First, the write program 53 receives a write request from the host computer 1 or another storage system 2 in step 1001 and identifies the logical volume targeted for the write operation in step 1002.

Then, in step 1003, the write program 53 determines whether the cache memory 223 space allocated to the read data is too small to store all write data.

If the cache memory 223 space allocated to the read data is large enough (the NO branch from step 1003), then processing proceeds directly to step 1005.

If, on the other hand, the cache memory 223 space allocated to the read data is too small (the YES branch from step 1003), then in step 1004 an additional memory space is allocated to the cache memory 223 to store all write data.

Then, the requester for the write operation transfers the write data to the cache memory 223 in step 1005.

Then, in step 1006, the write program 53 determines whether a cache-through operation is performed on the logical volume targeted for the write operation.

If no (the NO branch from step 1006), then the write program 53 issues a write request processing completion notification to the requester for the write operation in step 1007.

If yes (the YES branch from step 1006), then processing proceeds to step 1008.

Then, in step 1008, the write program 53 determines whether the logical volume targeted for the write operation has been defined as an external volume which is currently in a normal state. That is, it is determined whether the logical volume management information 61 on the logical volume includes an external volume number and furthermore the external volume state in the external volume management information 63 including the same external volume number is set to "normal".

If the logical volume targeted for the write operation has not been defined as an external volume which is currently in a normal state (the NO branch from step 1008), then the write program 53 identifies the corresponding drive 201 based on the drive information list in the drive group management information 62 (on the drive group) corresponding to the logical volume, and writes the write data to it in step 1009. Processing then proceeds to step 1011.

If, on the other hand, the logical volume targeted for the write operation has been defined as an external volume which is currently in a normal state (the YES branch from step 1008), then in step 1010 the write program 53 writes the write data to the external volume specified by the external volume management information 63 associated with the logical volume. Processing then proceeds to step 1011.

It should be noted that if the logical volume has been associated with both an external volume and a drive group which are currently in a normal state, the drive group may be accessed in preference to the external volume, which is not the case in steps 1008 to 1010. Further, the load on each access route may be measured when the write request has been received, and the access route under lower load conditions may be selected.

Lastly, in step 1011, the write program 53 determines whether a cache-through operation is performed on the logical volume targeted for the write operation in step 1011.

If no (the NO branch from step 1011), the write program 53 issues a write request processing completion notification to the requester for the write operation in step 1012, and then processing ends.

If yes (the YES branch from step 1011), then processing ends.

On the other hand (on the another storage system side, that is, the source storage system 2a side), the write request transferred in step 1010 is received by the source storage system 2a for which the external volume has been defined. The received write request is processed in the same manner as in the above steps shown in FIG. 14. However, in the source storage system 2a, the drive group is selected to be accessed (the NO branch from step 1008), and the write data is written to it in step 1009. Further, the write request processing completion notification is issued to the target storage system 2b in step 1012.

A description will be given below of a method for converting redundant data exchanged between the source storage system 2a and the target storage system 2b in such a way that data can be verified and corrected using the redundant data even during a data migration process regardless of the progress of conversion of the redundant data.

Figure 15:
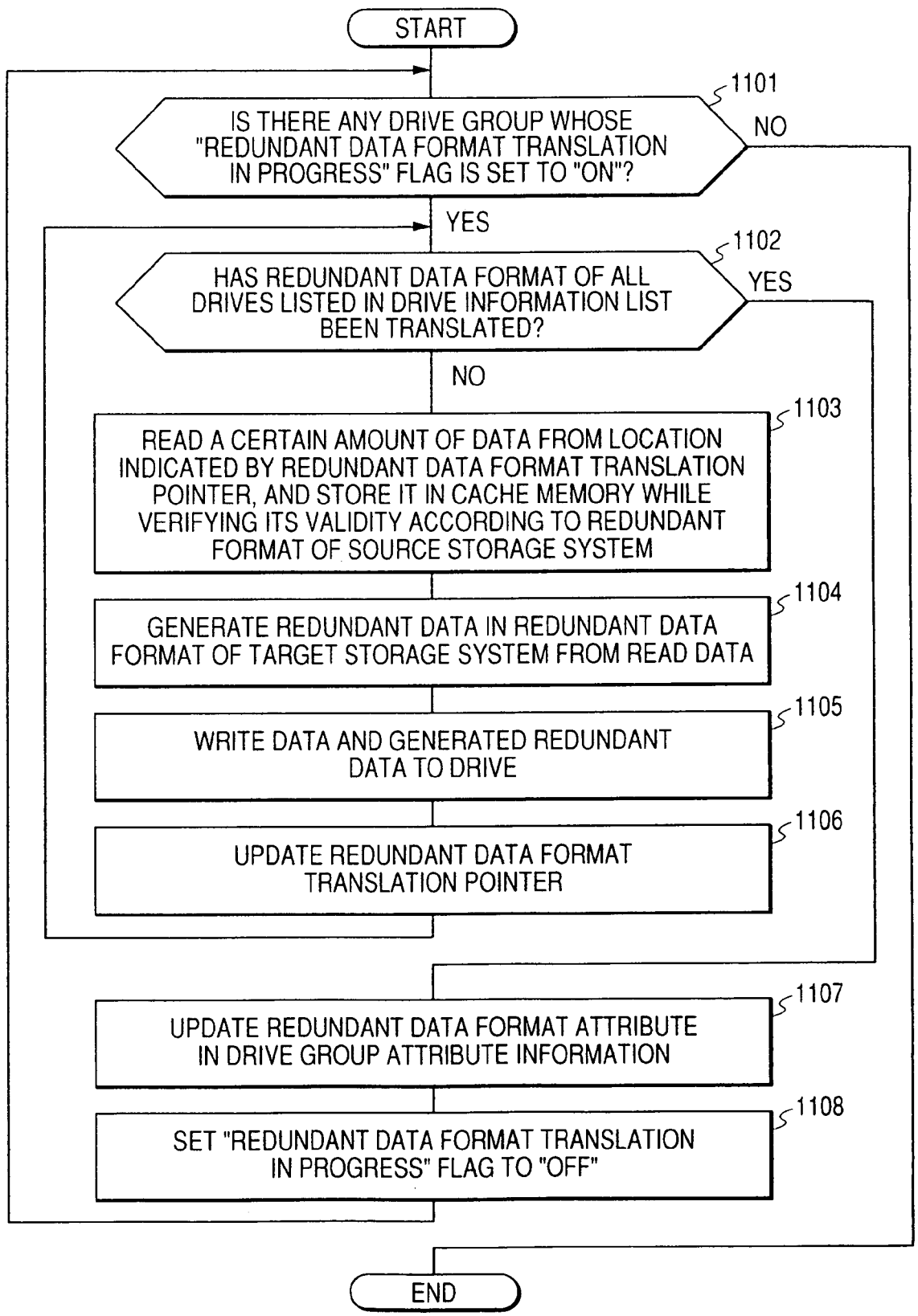
FIG. 15 is a flowchart of the processing performed by a format translation program 55 executed in the target storage system 2b.

FIG. 15 is a flowchart of the processing performed by the format translation program 55 executed in the target storage system 2b.

Redundant data is data added to each unit of data to be written to or read from a drive for data verification and correction purposes.

When the source storage system 2a and the target storage system 2b store redundant data in different formats with real data, if the drive 201 storing data to be migrated has been migrated from the source storage system 2a to the target storage system 2b, the present embodiment converts the format of the redundant data while receiving read/write requests for the data from the host computer 1.

The redundant data formats used by the source storage system 2a and the target storage system 2b may be different from each other, for example, when they employ different methods of calculating redundant data, or redundant data includes logical volume information on the source storage system 2a.

The target storage system 2b includes a format translation program 55 which translates a redundant data format into another redundant data format and supports the redundant data format of the source storage system 2a. Further, the drive group attribute information in the drive group management information 62 on each drive group includes: a redundant data format attribute for identifying a redundant data format; a "redundant data format translation in progress" flag for indicating whether or not the redundant data format is currently being translated; and a redundant data format translation pointer for indicating the progress of translation of the redundant data format.

When, in step 608 shown in FIG. 6A, the target storage system 2b creates the new drive group management information 62 based on the drive group management information received from the source storage system 2a in step 607, if the redundant data format attribute of the source storage system 2a is different from that of the target storage system 2b, the target storage system 2b performs the following operations: setting the redundant data format attribute in the new drive group management information to that of the source storage system 2a; setting the "redundant data format translation in progress" flag to "ON"; initializing the redundant data format translation pointer (setting the start address of the first drive in the drive information list); and activating the format translation program 55. The format translation program 55 is executed by the CPU in the CPU package 220.

First of all, the format translation program 55 determines whether there are any drive groups (management information 62) whose "redundant data format translation in progress" flag is set to "ON", in step 1101.

If there are no drive groups whose "redundant data format translation in progress" flag is set to "ON" (the NO branch from step 1101), then processing ends.

If there are such drive groups (the YES branch from step 1101), the format translation program 55 (selects one of them and) determines whether the redundant data format of all drives listed in the drive information list (on the drive group) has been translated by comparing the redundant data format translation pointer and the drive information list in step 1102.

If the data format of all drives has not yet been translated (the NO branch from step 1102), in step 1003 the format translation program 55 reads out a certain amount of data from the location on a drive 201 indicated by the redundant data format translation pointer and stores it in the cache memory 223 after verifying its validity according to the redundant data format of the source storage system 2a.

Then, the format translation program 55 generates redundant data in the redundant data format of the target storage system 2b from the read data in step 1104.

After that, the format translation program 55 writes the data and the generated redundant data from the cache memory 223 to the drive 201 in step) 1105.

Then, in step 1106, the redundant data format translation pointer is updated by the amount of read data. If the redundant data format translation operation has reached the end of the (current) drive region (specified by the drive number, start address, and capacity of the drive indicated in the drive information list), then the format translation program 55 sets the redundant data format translation pointer at the start address of the next drive in the drive information list and proceeds to step 1102.

If, on the other hand, the redundant data format of all the drives has been translated (the YES branch from step 1102), in step 1107 the format translation program 55 updates the redundant data format attribute in the drive group attribute information from the redundant data format attribute of the source storage system 2a to that of the target storage system 2b. The data format translation program 55 then sets the "redundant data format translation in progress" flag of the current drive group to "OFF" in step 1108 and returns to step 1101.

This completes the description of the redundant data format translation process. In writing or reading data, the redundant data is used as follows.

The read program 52 and the write program 53 perform the following operations in step 907 shown in FIG. 13 and in step 1009 shown in FIG. 14, respectively. When the "redundant data format translation in progress" flag in the drive group management information 62 on the drive group targeted for the read/write operation is set to "ON", these programs check the redundant data format translation pointer to see if the redundant data format translation has already been completed on the drive group targeted for the read/write operation. If so, they reads out the redundant data according to the redundant data format of the target storage system 2b. If not, they reads out the redundant data according to the redundant data format of the source storage system 2a. After that, these programs verify and correct the data using the redundant data.

Second Embodiment

A second embodiment of the present invention will be described below with reference to FIGS. 16 and 17.

First, a description will be given of the configuration of a computer system including storage systems according to the second embodiment of the present invention with reference to FIG. 16.

Figure 16:
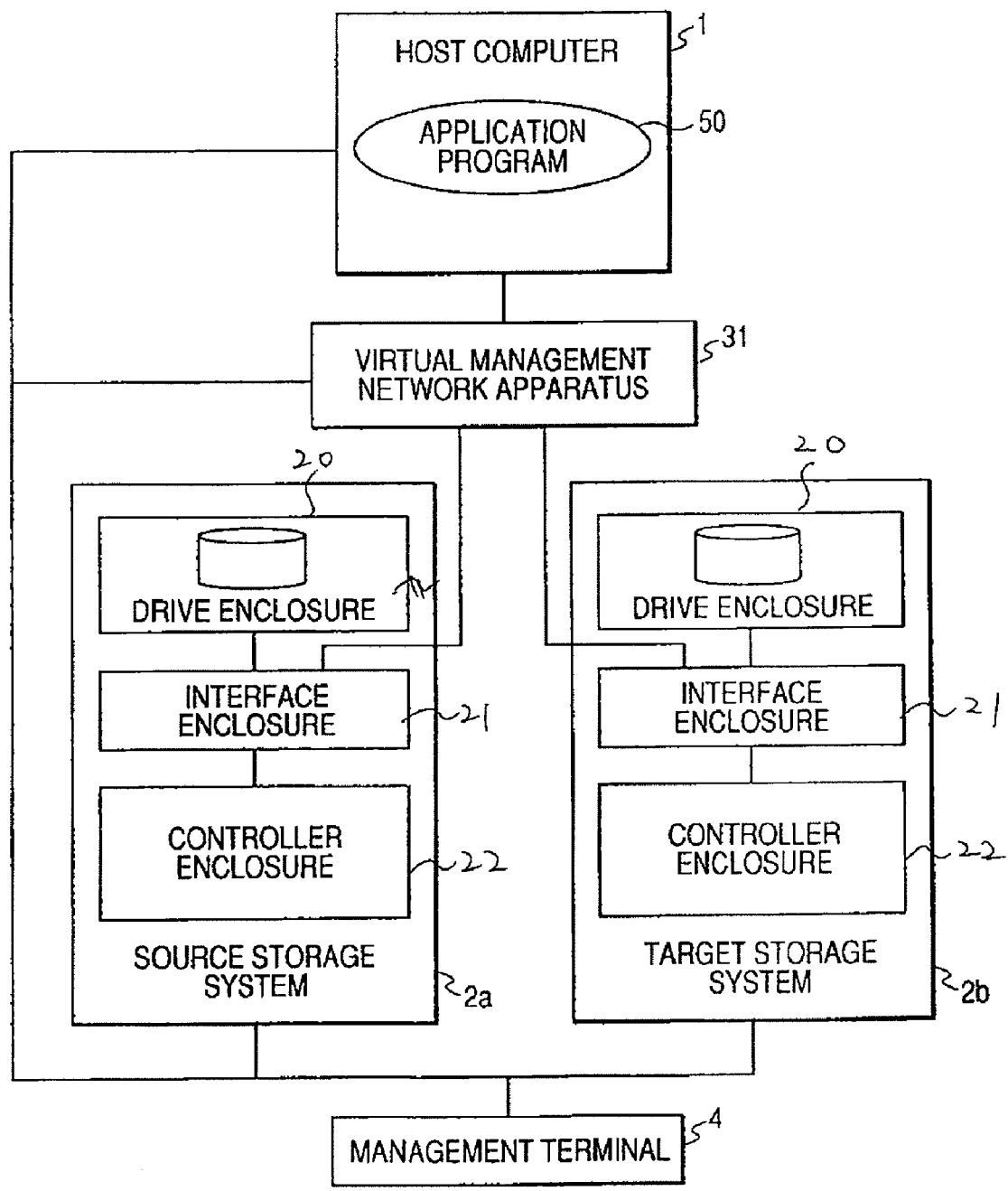
FIG. 16 is a diagram showing the configuration of a computer system including storage systems according to a second embodiment of the present invention.

FIG. 16 is a diagram showing the configuration of the computer system including storage systems according to the second embodiment of the present invention.

Figure 17:
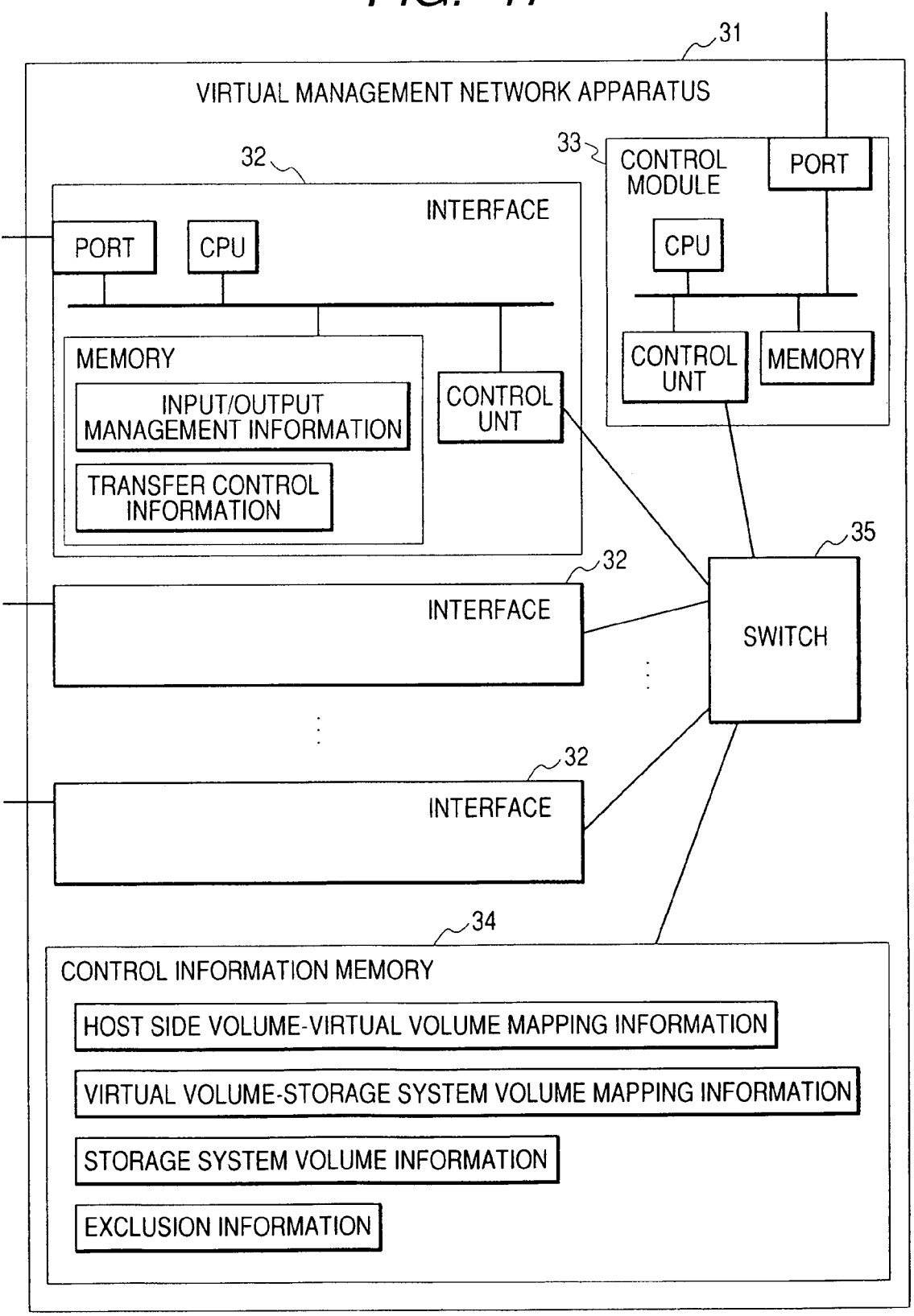
FIG. 17 is a diagram showing the configuration of a virtual management network apparatus.

FIG. 17 is a diagram showing the configuration of a virtual management network apparatus.

According to the first embodiment, the host computer 1 has the virtual management program 51 running thereon for switching between volumes to selectively access one of them.

According to the present embodiment, a virtual management network apparatus 31 corresponding to the network apparatus 3 of the first embodiment has a virtual management function to switch between a volume on the virtual management network 31 side or the host side and a volume on the storage system side.

The virtual management network apparatus 31 comprises a plurality of interfaces 32, a control module 33, control information memory 34, and a switch 35. The switch 35 connects all the other components together. These components may be connected by any connecting method such as a switch connection or bus connection. It should be noted that the control information memory 34 is duplicated to ensure availability.

The interfaces 32 are connected to the host computer 1 and the storage systems 2. The memory of each interface 32 stores input/output management information for managing read/write requests, data, status information, etc., and transfer control information (inside and outside of the virtual management network apparatus) for identifying their transfer destinations, etc.

The control module 33 is used to change the configuration of the virtual management network apparatus 31 and monitor the internal conditions. It should be noted that the virtual management network 31 may be connected to the management terminal 4, etc. and may operate according to instructions from the management terminal 4 or another external device.

The control memory 34 stores exclusion information, storage system volume information, "virtual volume to storage system volume" mapping information, "host side volume to virtual volume" mapping information, etc.

The exclusion information is used to update the data stored in the control memory 34 in an exclusive manner. The storage system volume information is information on volumes of the storage systems 2 detected by the virtual management network apparatus 31. The storage system volume information includes information specific to the storage systems 2, address information, volume numbers, etc.

The "virtual volume to storage system volume" mapping information lists each detected storage system volume and the corresponding virtual volume.

The "host side volume to virtual volume" mapping information is used to control how each virtual volume appears to the host computer 1 (that is, how the host computer 1 accesses each virtual volume).

The host computer 1 can access each virtual volume associated with it by the "host side volume to virtual volume" mapping information. To access a virtual volume, first the host computer 1 transmits an access request including host side volume identification information. Receiving this access request, the virtual management network apparatus 31 checks the "host side volume to virtual volume" mapping information to determine the virtual volume and then checks "virtual volume to storage system volume", mapping information to determine the storage system 2 and the volume number (of the storage system volume) based on the identification information included in the access request.

Then, the virtual management network apparatus 31 converts the access request received from the host computer 1 into an access request including the determined volume number (or identification information on the determined volume) and transmits it to the determined storage system 2.

When it is necessary to switch volumes to be accessed by the host computer 1, the virtual management network apparatus 31 rewrites the "virtual volume to storage system volume" mapping information according to a volume switch instruction from the management terminal 4. That is, the virtual management network apparatus 31 changes the storage system volume associated with the virtual volume corresponding to the host side volume indicated by the virtual management network apparatus 31 to the host computer 1 when the virtual management network apparatus 31 causes the host computer 1 to access the logical volume on the drive to be migrated. Specifically, the virtual management network apparatus 31 switches from the logical volume on the drive to be migrated in the source storage system 2a to the logical volume of the target storage system 2b which has been defined as an external volume for the logical volume on the drive to be migrated. With this arrangement, the virtual management network apparatus 31 can cause the host computer 1 to access the logical volume on the drive to be migrated using the same host side volume identification information and the same virtual volume identification information even after switching from the source storage system 2a to the target storage system 2b. It should be noted that the rewriting of the "virtual volume to storage system volume" mapping information and the transmission of an access request based on the mapping information are carried out by programs in the memory of the virtual management network apparatus 31 which are executed by the CPU within the virtual management network apparatus 31.

According to the present embodiment, step 504 in FIG. 5 registers the logical volume of the target storage system 2b which has been defined as an external volume for the logical volume on the drive to be migrated, as storage system volume information. Further, step 505 rewrites the "virtual volume to storage system volume" mapping information such that the storage system volume associated with the virtual volume (corresponding to the host side volume indicated by the virtual management network apparatus 31 to the host computer 1 when the virtual management network apparatus 31 causes the host computer 1 to access the logical volume on the drive to be migrated) is changed from the logical volume on the drive to be migrated in the source storage system 2a to the logical volume of the target storage system 2b which has been defined as an external volume for the logical volume on the drive to be migrated.

What is claimed is:

1. A disk array system comprising:
a source storage system; and
a target storage system,
wherein said source and target storage systems are connected to one another through a network,
wherein said source and target storage systems, each includes:
a storage apparatus;
a storage control apparatus;
a plurality of storage interface units including a first storage interface unit and a second storage interface unit for connecting between said storage apparatus and said storage control apparatus; and
an upper interface unit for connecting with a host computer, said storage apparatus including a first input/output port for coupling with
said first storage interface unit and a second input/output port for coupling with said second storage interface unit,
wherein to migrate said storage apparatus in said source storage system and said second storage interface unit in said source storage system to said target storage system, said disk array system performs the steps of:
causing a management program to switch from a logical volume of said source storage system to a logical volume of said target storage system to access said logical volume of said target storage system;
defining a logical volume, which is on said storage apparatus to be migrated, in said source storage system as an external volume of said target storage system, and setting to receive an access targeted to said logical volume, through said network and through said first input/output port of said storage apparatus to be migrated, as an access targeted to said external volume of said target storage system, said first input/output port being connected to said first storage interface unit in said source storage system;
blocking said second input/output port of said storage apparatus to be migrated, said second input output port being currently connected to said second storage interface unit in said source storage system, said blocking including logically blocking said second input/output port of said storage apparatus to be migrated;
setting up said second storage interface unit in said target storage system, connecting said second input/output port of said storage apparatus to be migrated with said second storage interface unit in said target storage system, transmitting information on said logical volume on said storage apparatus to be migrated to said target storage system, defining said logical volume on said storage apparatus to be migrated as the logical volume of said target storage system, and setting to receive an access targeted to said logical volume on said storage apparatus to be migrated through said connected second input/output port of said storage apparatus to migrated to as an access to said logical volume of said target storage system, said connecting including physically connecting said second input/output port of said storage apparatus to be migrated with said second storage interface unit in said target storage system; and blocking said first input/output port of said storage apparatus to be migrated, said first input/output port being currently connected to said first storage interface unit in said source storage system, said blocking including logically blocking said first input/output port of said storage apparatus to be migrated.

2. The disk array system as claimed in claim 1, wherein:

said storage control apparatus in said source storage system includes cache memory; and dirty data in cache memory is destaged to said storage apparatus to be migrated before connecting said second input/output port of said storage apparatus to be migrated with said second storage interface unit, said dirty data having not yet been written back to said storage apparatus to be migrated.

3. The disk array system as claimed in claim 1, wherein:

said storage control apparatus in said source storage system includes a first switch and a second switch, and said storage control apparatus in said target storage system includes a switch;

each switch is connected to said storage interface units and has an expansion port for connecting and communicating with another switch;

each storage apparatus is accessed through one or more switches of said storage control apparatus and one or more storage interface units;

said first switch is connected to said first storage interface unit in said source storage system;

said second switch is connected to said second storage interface unit; and to migrate said storage apparatus to be migrated, said second storage interface unit, and said second switch of said storage control apparatus in said source storage system to said target storage system, said disk array system performs steps of:

setting to receive an access targeted to said logical volume on said storage apparatus to be migrated through said network, said first switch of said storage control apparatus in said source storage system, and said first storage interface unit as said external volume of said target storage system;

blocking said second input/output port of said storage apparatus to be migrated, said second input/output port being currently connected to said second storage interface unit in said source storage system, said blocking including logically blocking said second input/output port of said storage apparatus to be migrated;

connecting said expansion port of said second switch with said expansion port of said switch of said second storage control apparatus in said target storage system;

setting up said second storage interface unit in said target storage system, and connecting said second storage interface unit with said second input/output port of said storage apparatus to be migrated, said connecting including physically connecting said second storage interface unit with said second input/output port of said storage apparatus to be migrated; and setting to receive an access targeted to said storage apparatus to be migrated through said switch of said storage control apparatus in said target storage system and said second switch of said first storage control apparatus in said source storage system as a storage apparatus in said target storage system.

4. The disk array system as claimed in claim 1, wherein:

redundant data is added to data stored in said storage apparatuses in said source and target storage systems to verify and correct said data;

when the redundant data format of said storage apparatus in said source storage system is different from that of said storage apparatus in said target storage system, redundant data in said logical volume on said storage apparatus to be migrated is translated into said redundant data format of said storage apparatus in said target storage system; and when said disk array sets to receive an access targeted to said storage apparatus to be migrated, said second storage control apparatus performs the steps of:

verifying and correcting first data in said storage apparatus to be migrated according to said redundant data format of said storage apparatus in said source storage system if redundant data for said first data has not yet been translated into said redundant data format of said storage apparatus in said target storage system; and verifying and correcting said first data in said storage apparatus to be migrated according to said redundant data format of said storage apparatus if said redundant data for said first data has already been translated into said redundant data format of said storage apparatus.

* * * * *

UNITED STATES PATENT AND TRADEMARK OFFICE
CERTIFICATE OF CORRECTION

| | | |
|---|---|---|
| PATENT NO. | : 8,041,909 B2 | Page 1 of 1 |
| APPLICATION NO. | : 11/890971 | |
| DATED | : October 18, 2011 | |
| INVENTOR(S) | : Noboru Morishita | |

It is certified that error appears in the above-identified patent and that said Letters Patent is hereby corrected as shown below:

Title Page:

In the bibliographic data at (75) Inventors,

"Noboru Morishita, Yokohama (JP);
Yusutomo Yamamoto, Sagamihara (JP)"

should read,

-- Noboru Morishita, Yokohama (JP);
Yasutomo Yamamoto, Sagamihara (JP) --

Signed and Sealed this
Fourteenth Day of August, 2012

David J. Kappos
*Director of the United States Patent and Trademark Office*